(12) United States Patent
Sheth et al.

(10) Patent No.: US 11,570,242 B2
(45) Date of Patent: *Jan. 31, 2023

(54) ATTESTATION-BASED SCHEME FOR VALIDATING PEERING SETUPS FOR CRITICAL INFRASTRUCTURE PROTOCOLS

(71) Applicant: Cisco Technology, Inc., San Jose, CA (US)

(72) Inventors: Sujal Sheth, Gujarat (IN); Shwetha Subray Bhandari, Bangalore (IN); Eric Voit, Bethesda, MD (US); William F. Sulzen, Apex, NC (US); Frank Brockners, Cologne (DE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,731

(22) Filed: Oct. 12, 2021

(65) Prior Publication Data

US 2022/0070251 A1 Mar. 3, 2022

Related U.S. Application Data

(63) Continuation of application No. 16/783,942, filed on Feb. 6, 2020, now Pat. No. 11,165,861.

(60) Provisional application No. 62/830,174, filed on Apr. 5, 2019.

(51) Int. Cl.
*G06F 15/173* (2006.01)
*H04L 67/104* (2022.01)
*H04L 9/40* (2022.01)
*H04W 24/10* (2009.01)
*H04L 9/32* (2006.01)
*H04L 61/4511* (2022.01)
*H04L 67/1001* (2022.01)

(52) U.S. Cl.
CPC .......... *H04L 67/104* (2013.01); *H04L 9/3247* (2013.01); *H04L 61/4511* (2022.05); *H04L 63/0823* (2013.01); *H04L 67/1001* (2022.05); *H04W 24/10* (2013.01)

(58) Field of Classification Search
CPC ............... H04L 61/4511; H04L 9/3247; H04L 63/0823; H04W 24/10
USPC ........................................ 709/224, 223, 202
See application file for complete search history.

(56) References Cited

U.S. PATENT DOCUMENTS

| 8,266,676 | B2 * | 9/2012 | Hardjono | ............ H04L 63/1433 |
| | | | | 713/181 |
| 2010/0235912 | A1 | 9/2010 | Hermann et al. | |
| 2015/0089645 | A1 | 3/2015 | Vandergeest | |

(Continued)

*Primary Examiner* — Lan Dai T Truong
(74) *Attorney, Agent, or Firm* — Polsinelli

(57) ABSTRACT

A verifier peer system transmits a request to an application of another peer system to obtain integrity data of the application. In response to the request, the verifier peer system obtains a response that includes kernel secure boot metrics of the other peer system and integrity data of the application and of any application dependencies. If the verifier peer system determines that the response is valid, the verifier peer system evaluates the integrity data and the kernel secure boot metrics against a set of Known Good Values to determine whether the integrity data and the kernel secure boot metrics are valid. If the integrity data and the kernel secure boot metrics are valid, the verifier peer system determines that the other peer system is trustworthy.

20 Claims, 9 Drawing Sheets

(56) References Cited

U.S. PATENT DOCUMENTS

2018/0365422 A1 12/2018 Callaghan et al.
2021/0091952 A1 3/2021 Wentz

* cited by examiner

ATTESTATION-BASED SCHEME FOR VALIDATING PEERING SETUPS FOR CRITICAL INFRASTRUCTURE PROTOCOLS

CROSS-REFERENCE TO RELATED APPLICATIONS

This application is a continuation of U.S. Non-Provisional patent application Ser. No. 16/783,942, filed on Feb. 6, 2020, which claims the benefit of U.S. Provisional Patent Application No. 62/830,174, filed on Apr. 5, 2019, the full disclosures of each are incorporated herein by reference in their entireties.

TECHNICAL FIELD

The present disclosure generally relates to the field of computer networking, particularly with regard to assessing the reliability and trustworthiness of devices operating within a network.

BACKGROUND

When sensitive information is exchanged and accepted from a critical network infrastructure service that relies on, for instance, the Dynamic Host Configuration Protocol (DHCP), the Domain Name System (DNS), or the Secure Shell (SSH) protocol, establishing a secure communications channel that relies on credential information (e.g., passwords, etc.) or a public key infrastructure (PKI) is generally not sufficient. The critical network infrastructure service or a node hosting the service may be compromised, which can result in sensitive information also being compromised and in denial of service attacks or hijacking/redirection of network traffic. As a result, such schemes for validating the integrity of a node hosting the service and the software components on the node can be insufficient. This becomes even more challenging as the services offered are administered by multiple infrastructure providers.

If an attacker gains root access to a device via an exploit, traditional protections such as using Transport Layer Security (TLS) and/or Secure Sockets Layer (SSL) protocols for establishing a secure communications channel and using Layer 2 (L2) or Layer 3 (L3) encryption for interfaces will prove ineffectual. Moreover, trustworthiness of a given device operating within a network may degrade from the time of its initial configuration. However, verification checks that rely on active measurements for validation of device processing traffic are generally expensive and often lack adequate accuracy.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
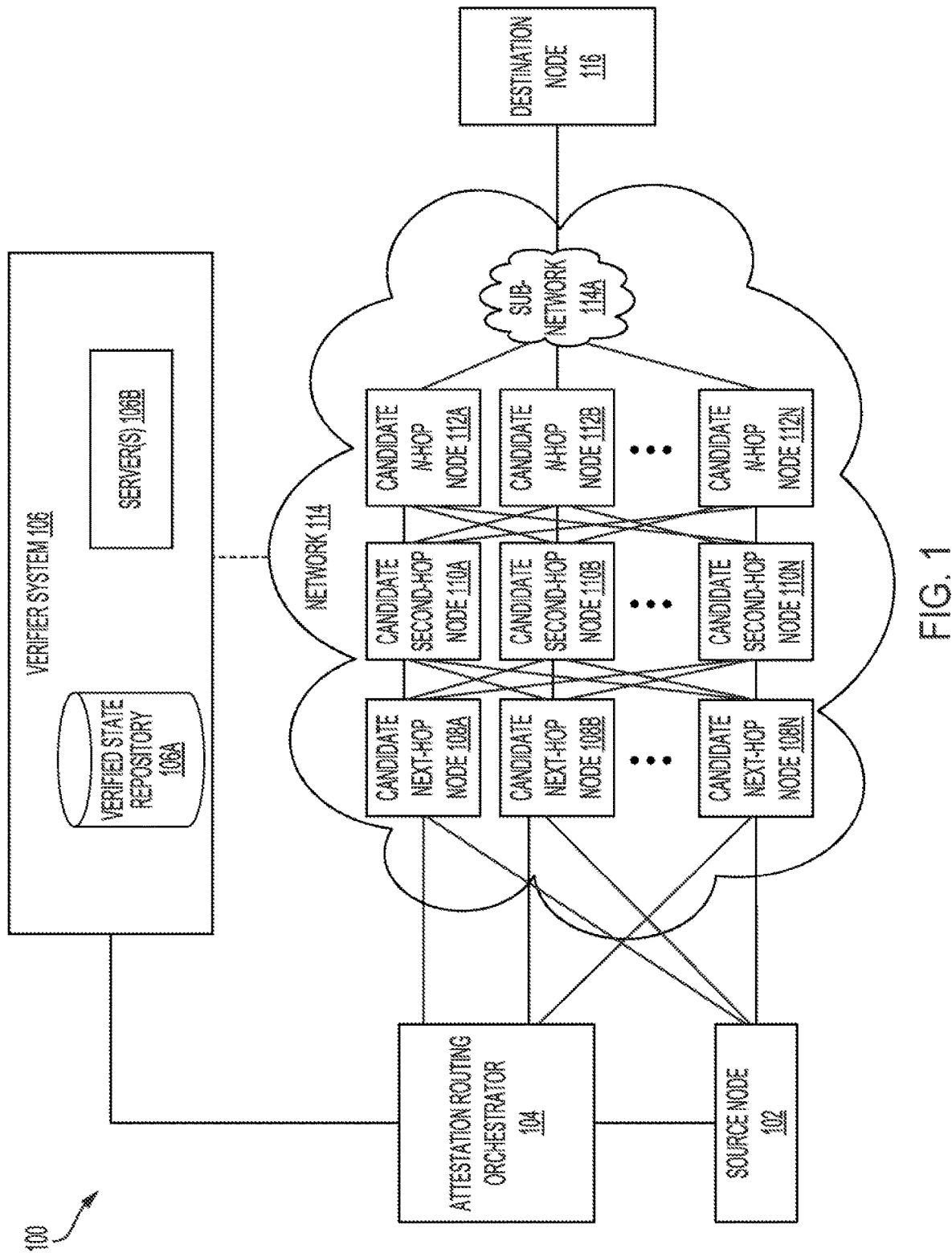
FIG. 1 shows an illustrative example of a networking environment in accordance with various implementations.

Numerous details are described in order to provide a thorough understanding of the example implementations illustrated in the figures. However, the figures merely illustrate some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

The detailed description set forth below is intended as a description of various configurations of embodiments and is not intended to represent the only configurations in which the subject matter of this disclosure can be practiced. The appended figures are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

A computer network can include geographically distributed nodes (e.g., network devices, client devices, sensors, other computing devices, etc.) interconnected by communication links and segments for sending data between end nodes. Many types of networks are available, including, for example, local area networks (LANs), wide area networks (WANs), software-defined networks (SDNs), wireless networks, core networks, the Internet, etc. The nodes typically communicate over the network by exchanging frames or packets of data according to predefined protocols, such as the Transmission Control Protocol/Internet Protocol (TCP/IP). In this context, a protocol can include a set of rules defining how the nodes interact with each other.

Some computer networks and nodes can communicate based on the Open Systems Interconnection model (OSI model), which provides a conceptual, layered model that describes and standardizes communication functions of a computer network or node. The OSI model includes seven (7) layers: the physical layer (Layer 1), the data link layer (Layer 2), the network layer (Layer 3), the transport layer (Layer 4), the session layer (Layer 5), the presentation layer (Layer 6), and the application layer (Layer 7).

When data traffic is transmitted through one or more networks, the data traffic typically traverses a number of nodes that route the traffic from a source node to a destination node. While having numerous nodes can increase network connectivity and performance, it also increases security risks, as each node that a packet traverses introduces a risk of unauthorized data access and manipulation. For example, when a packet traverses a node, there is a security risk that is introduced which can result from the node being potentially compromised (e.g., hacked, captured, etc.).

As a result, compliance, security, and audit requirements are often implemented to require network users and entities to prove that their associated network traffic complies with specific business and/or security policies. When sensitive information is being transmitted via nodes in a network (e.g., in battlefield settings, banking settings, healthcare settings, etc.), traffic should be sent through un-compromised network nodes (e.g., nodes that have not been hacked, captured, etc.) to prevent access to, leakage of, and/or tampering with data and sensitive information. If an attacker gains unauthorized root access to a device via an exploit, many protection and encryption approaches for interfaces may be ineffective at mitigating or addressing such unauthorized access and resulting damage.

Proving that network traffic complies with specific policies can involve proving, in a secure method, that the traffic has traversed a well-defined set of network nodes (e.g., firewalls, switches, routers, etc.) and that these network nodes have not been modified or compromised. This is one example approach for ensuring that the network nodes have performed the required or expected actions (e.g., packet processing, security or policy compliance verification, routing, etc.) on the packet and that the packet has traversed the network nodes. Other ways to ensure policy compliance can include attestation mechanisms.

Some security approaches that can be implemented aim to remove any implied trust in the network used for connecting applications hosted on devices, such as mobile devices, to cloud or enterprise hosted services. Moreover, some approaches can be implemented to verify the identity or trustworthiness of the network and/or network nodes traversed by packets. Further, some approaches can be used to verify whether traffic has traversed a specific set of network nodes, such as trusted or verified network nodes. Non-limiting examples of such approaches can include Proof-of-Transit (POT) implementations, Trusted Platform Module (TPM) implementations, attestation implementations, and proof of integrity implementations (e.g., TPM measurement validation tokens, etc.), among others.

POT is a technology that enables a network user or other entity to verify whether network traffic has traversed a defined set of network nodes. Attestation, as further described below, can also be used to verify the integrity of a node. In some cases, the approaches herein can integrate both POT implementations and attestation to offer a secure approach that allows network users or other entities to verify that network traffic has traversed a pre-defined set of nodes and that such nodes have not been compromised.

A TPM provides methods for collecting and reporting the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state information that is separate from the host system on which the TPM reports identity and/or other information. TPMs can be implemented on physical resources (indirectly or directly) of the host system. In some examples, a TPM component can have a processor and memory such as random-access memory (RAM), read-only memory (ROM) and/or flash memory. In other implementations of a TPM, a host processor can execute TPM code while the host processor is in a particular execution mode. Parts of system memory can be partitioned by hardware to ensure that memory used by the TPM is not accessible by the host processor unless the host processor is in the particular execution mode.

Trusted computing (TC) approaches, such as use of a TPM, may rely on Roots of Trust (RoT). RoT can include system elements that need to be trusted because suspicious or other unusual activity by such system elements may not be detectable. A set of roots can provide a minimum functionality necessary to describe characteristics that affect a platform's trustworthiness. In some cases, while determining if a RoT is performing properly may not be possible, it may be possible to determine how roots are implemented. For example, digital certificates can provide assurances that the root has been implemented in a way that renders it trustworthy. For example, a digital certificate may specify the manufacturer and evaluated assurance level (EAL) of a TPM. Such certification can provide a level of confidence in the RoT used in the TPM. Moreover, a digital certificate from a platform manufacturer may provide assurance that the TPM was properly installed on a computing system that is compliant with specific requirements so the RoT provided by the platform may be trusted. Some implementations can require three RoT in a trusted platform, including RoT for Measurement (RTM), RoT for Storage (RTS), and RoT for Reporting (RTR).

The RTM can send integrity information, such as integrity measurements, to the RTS. Generally, the RTM can be a Central Processing Unit (CPU) controlled by a Core Root of Trust for Measurement (CRTM). The CRTM is the first set of instructions executed when a new chain of trust is established. When a system is reset, the CPU (e.g., RTM) can execute the CRTM, which can then send values that indicate its identity to the RTS. The starting point for a chain of trust can be established in this manner.

As previously noted, the TPM memory can be shielded from access by entities other than the TPM. Thus, since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing technology that can be used to verify the integrity of a node. Attestation can be applied to a node, such as a router or switch, to review logs from Layer 1 (L1) or Layer 2 (L2) connected devices and maintain these logs in trusted storage. These logs can be known to be un-compromised as a private cryptographic key can be embedded into every trust anchor produced for a hardware device, and the device's public cryptographic key can be published as a digital certificate to adjacent devices. This peering device can then push log updates from trusted storage periodically and/or on a log entry event. Reviewing any provided digitally signed logs can provide an understanding of the current trustable state of a peer device. Moreover, by looking back at the set of transactions which have occurred since boot time, a determination can be made regarding the trustworthiness of the information which that peer device is asserting.

In other examples, TPM measurement validation tokens can be used to provide verifiable evidence of device tampering. Such verifiable evidence can be appended to protocol interactions. This provides evidence receivers the option of evaluating trustworthiness of a network device and reacting accordingly. For example, an evidence receiver may determine that it no longer trusts a network device and, as a result, adjust a network policy to mitigate possible damage. Dedicated crypto-processors, such as a TPM, can take measurements to attest to the identity of a device and its operating binaries. These measurements include evidence that the device is in a known safe state. However, an evidence receiver should be able to certify the evidence as being current. Without a guarantee that the evidence is current, an attacker has an opening to inject previously recorded measurements, asserting that what is being replayed is current.

Some approaches can detect the replaying of old or otherwise stale evidence via a "nonce". A nonce is a random number provided by the entity making the request. This nonce is passed into the TPM. Results generated by the TPM include a digital signature generated using the nonce as input. The result, which could not have been generated before the nonce was provided, is output from the TPM. A downside of the nonce can be that it is grounded in a transactional challenge/response interaction model. In other words, a nonce may not work with unidirectional communications originating from the attesting device. For example, a nonce may not work with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events reduction of network access from a suspect device, or can become a part of Admission Control (e.g., IEEE 802.1X). Some platforms can be configured to support the unidirectional attestation mechanism.

Alternate approaches for validating data as being current that do not rely on a nonce can be based on trusted computing capabilities, such as a TPM. For example, a TPM measurement validation token can be generated which allows external entities to validate asserted data as being current based on the state of internal counters within the TPM. With this token, a nonce is not necessary to detect replay attacks, and attestation for asynchronous push, multicast, and broadcast can be done. The TPM measurement validation token can include a digitally signed measurement that can be used to prove its authenticity and can indicate an early sign of a potential issue.

Such an approach can be combined with TPM-integrated capabilities aimed at verifying that valid binary processes are being executed. These capabilities can include, for example, Trusted Execution Environments (TEE), which provide runtime malware protections, Authenticated Code Modules (ACM), which ensure that only digitally signed code modules can be loaded into a CPU, and the like. The alternate approach for validating asserted data as being current can work with Cisco® Secure Boot, the Linux® Integrity Measurement Architecture (IMA), Intel® Trusted Execution Technology (TXT), etc. These technologies can validate that a processor is running known software with a valid chain of binary signatures.

The creation of the TPM measurement validation token can be accomplished by extracting current counters from an attestee's TPM and hashing these current counters with information within an external TPM. The result can be a non-spoofable token that binds continuously incrementing counters on an attestee with some known external state information. Any resetting of the TPM counters is visible in any subsequent TPM queries. Any restarting of a platform is exposed in subsequent TPM queries. Within these bounds of reset and restart, the TPM's timeticks counter continuously increments. Therefore, any push of attestee TPM information which includes these counters is known to have occurred subsequent to any previously-received measurement. Further, if the reset and restart counters have not changed, the incremental time since any previous measurement is also known.

The majority of information needing to be trusted by network peers may not be contained within the TPM's Program Configuration Registers (PCR). As a result, indirect methods of validating that a device has not been compromised can also be applied.

The receipt of TPM measurement validation tokens means that an evidence receiver needs to have the option of verifying the information. It does not require that supplementary evidence be sent with the TPM measurement validation token. For non-controller based implementations, it also does not require that the verification steps occur on the evidence receiver.

For integrity verification, a controller or device can implement an integrity verification application. The integrity verification application can be designed to recognize change events and evaluate Known Good Values (KGVs), which will also allow evaluation of a boot-integrity TPM measurement validation token and a running process binary signature TPM measurement validation token based on TPM counters. On any discrepancy, a controller can isolate a compromised device from all of its network peers by shutting the interfaces.

In some examples, one or more TPM measurement validation tokens and/or verifications for integrity verification can be implemented, such as a measured-boot token (e.g., Secure Hash Algorithm-1 (SHA-1) hash over PCRs 0-7), verified-boot token (e.g., only recognized binaries were executed when booting (e.g., IMA-sig), process token (e.g., RoT validated through a process which is asserting a particular protocol or protocols), file-system token (e.g., all files within a vendor determined set of directories), log-integrity token (e.g., used to augment existing integrity analytics and forensics), configuration token (e.g., state of the current device configuration), etc. Some implementations can achieve all or some of these tokens, depending on the implementation.

In some examples, systems, methods, and computer-readable media are described for an attestation-based scheme for validating peering setup for critical infrastructure protocols. According to at least one example, a method is provided for an attestation-based scheme for validating peering setup for critical infrastructure protocols. The method can include transmitting, to an application executing on a computer system within a network, a request to obtain first integrity data of the application; obtaining, in response to the request, a response comprising the integrity data of the application and kernel secure boot metrics of a kernel executing on the computer system; obtaining a first set of reference values corresponding to the integrity data of the application and a second set of reference values corresponding to the kernel secure boot metrics; determining, based on a first comparison of the first set of reference values to the first integrity data and a second comparison of the second set of references values to the kernel secure boot metrics, that the integrity data and the kernel secure boot metrics are valid; and as a result of the integrity data and the kernel secure boot metrics being valid, determining that the computer system is trustworthy.

In another example, a system is provided for an attestation-based scheme for validating peering setup for critical infrastructure protocols. The system can include one or more processors and a memory including instructions that, as a result of being executed by the one or more processors, cause the system to transmit a request to a second system to obtain integrity data of an application executing on the second system; obtain a response comprising the integrity data, second integrity data of one or more application dependencies of the application, and kernel secure boot metrics of a kernel of the second system; verify that the response is valid; evaluate the integrity data and the kernel secure boot metrics using a set of Known Good Values (KGVs) to determine whether to authenticate the application, resulting in a determination; and based on the determination, evaluate at least a subset of the second integrity data to determine whether to authenticate the second system.

In another example, a non-transitory computer-readable medium is provided for an attestation-based scheme for validating peering setup for critical infrastructure protocols. The non-transitory computer-readable medium can include instructions which, when executed by one or more processors, cause a computer system to transmit, to a second computer system, a request to obtain integrity data of an application executing on the second computer system; obtain, in response to the request, a response comprising the integrity data, second integrity data of a set of application dependencies associated with the application, and kernel secure boot metrics of a kernel of the second computer system; and evaluate the response using a set of Known Good Values (KGVs) of the integrity data, the second integrity data, and the kernel secure boot metrics to determine whether to trust the second computer system.

In some aspects, the method, non-transitory computer-readable medium, and system described above can include transmitting, to a Domain Name System (DNS) server, a second request to obtain the first set of reference values and the second set of reference values, the second request specifying a host name of the computer system.

In some examples, the integrity data of the application can include a set of measurements of a plurality of application dependencies. Moreover, in some aspects, the method, non-transitory computer-readable medium, and system described above can include selecting, from the plurality of application dependencies, one or more application dependencies; identifying a subset of the set of measurements corresponding to the one or more application dependencies; and comparing the subset of the set of measurements to the first set of reference values to determine that the one or more application dependencies are trustworthy.

In some examples, the request to obtain the first integrity data of the application can include a nonce and a digital signature, and the nonce and the digital signature can be used by the computer system to authenticate the request.

In some examples, the response to the request can further include a nonce, a digital signature of a kernel service operating on the computer system, and a connection description. In some aspects, the method, non-transitory computer-readable medium, and system described above can include determining whether the nonce, the digital signature of the kernel service, and the connection description are valid.

In some aspects, the method, non-transitory computer-readable medium, and system described above can include establishing a trusted digital certificate chain with the computer system to allow authentication of the response.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

Description of Example Embodiments

Figure 8:
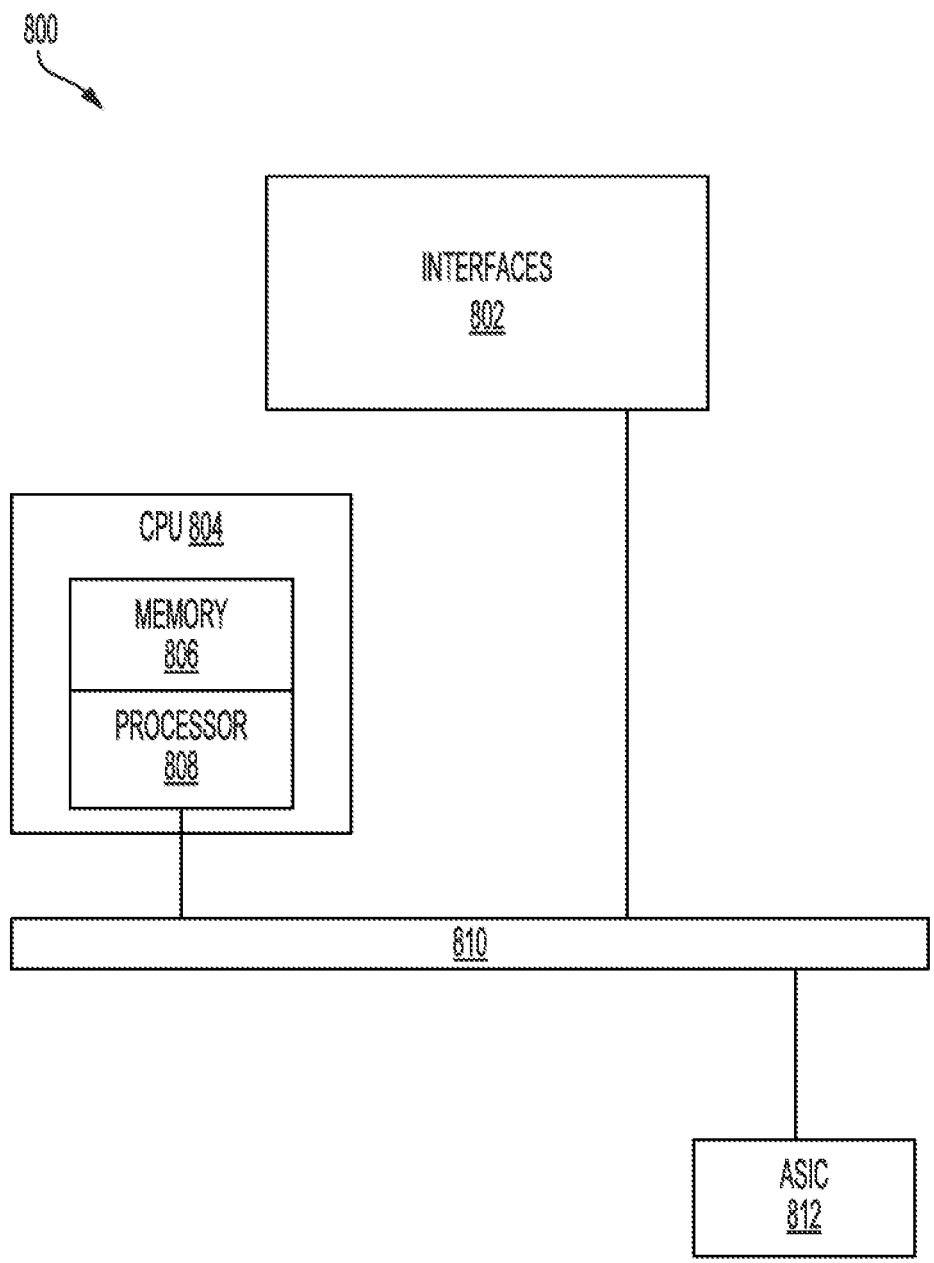
FIG. 8 illustrates an example network device suitable for performing switching, routing, and other networking operations in accordance with some implementations.
Figure 9:
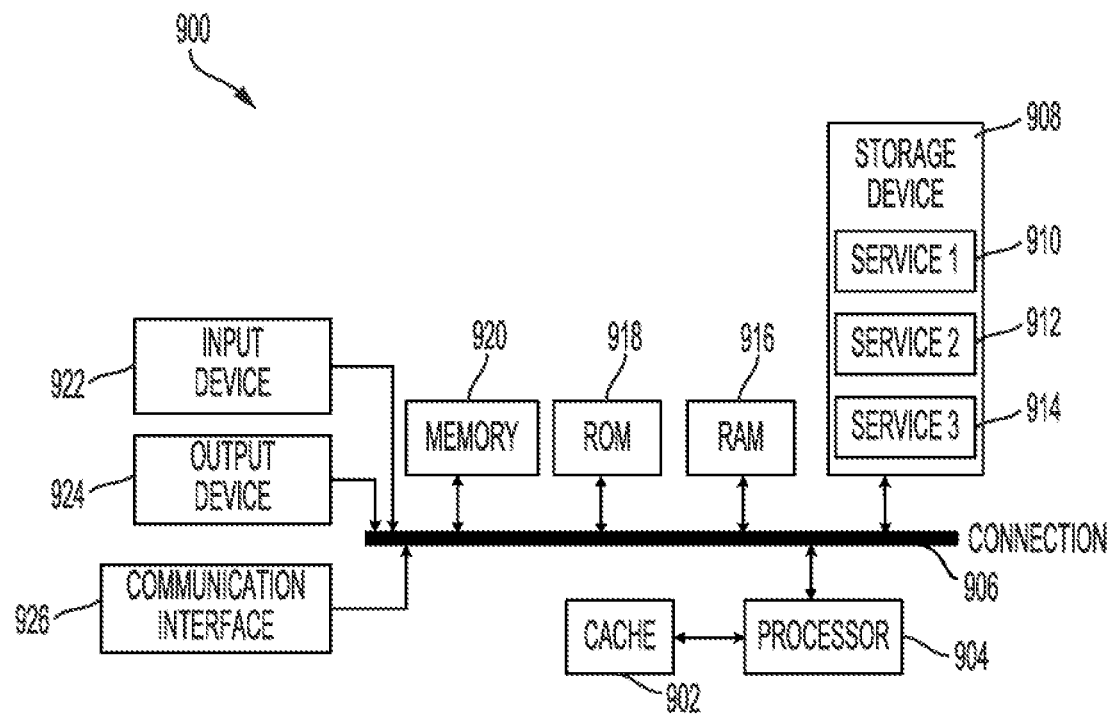
FIG. 9 illustrates a computing system architecture including various components in electrical communication with each other using a connection in accordance with some implementations.

Disclosed herein are systems, methods and computer-readable storage media for an attestation-based scheme for validating peering setup for critical infrastructure protocols. The present technologies will be described in more detail in the following disclosure as follows. The discussion begins with an introductory description of an attestation-based scheme for validating peering setup for critical infrastructure protocols. A more detailed description of example systems, processes and environments for providing an attestation-based scheme for validating peering setup for critical infrastructure protocols, as illustrated in FIGS. 1 through 7, will then follow. The discussion concludes with a description of an example network and computing devices, as illustrated in FIGS. 8 and 9.

The disclosure now turns to an introductory description of an attestation-based scheme for validating peering setup for critical infrastructure protocols.

In some examples, attestation technologies and schemes can be implemented for validating peering setup for critical (and other) infrastructure protocols, such as DHCP, DNS, SSH, etc. Such attestation can be applied to any nodes (e.g., servers, routers, switches, virtual entities, etc.) offering a critical service to measure and/or maintaining logs in trusted storage. Such logs can be known to be un-compromised when a vendor embeds a private cryptographic key into every trust anchor produced for a hardware device, and the hardware device's public cryptographic key is published as a digital certificate. This hardware device can then push log updates from trusted storage periodically and/or on some log entry event. Reviewing any provided digitally signed logs allows an understanding of the current trustable state of a device or service. Moreover, by evaluating the set of transactions which have occurred since booting the node, a determination can be made regarding the trustworthiness of the information which that peer device is asserting.

In some cases, using attestation for validating the integrity of a node and modules within the node before peering with the node for a service can be challenging for various reasons. For example, such attestation before peering can result in large volumes of measurement logs and reports for a system in steady state, a large amount of computation needed and latency added in validating the reported measurements, issues related to how current the report is against the service being measured, limited or difficult access to KGVs for modules and services for validation. However, the approaches herein can provide optimization of attestation, validation and access to known good values to validate against.

In some examples, the approaches herein can provide peer-to-peer application integrity verification as follows.

Setup

To provide integrity verification, in some examples, all the devices can be setup with a trusted digital certificate chain for verification of digital certificates and a digital signature from peer devices.

Peer Request

As part of an application protocol exchange, peers can request integrity data of the application. To prevent any replay attacks, a peer may transmit, along with the request for integrity data, a nonce that may be used by the application in preparation of its response to the request. The application, in response to receiving the request from a peer, can submit a first application programming interface (API) call to a kernel service to retrieve the integrity data of the application. Additionally, in response to the request from the peer, the application may submit a second API call to a kernel metrics storage service to obtain the kernel secure boot metrics for the kernel. The application may send a request for integrity data of all the other applications and/or processes the current application may depend on. These downstream applications and/or processes can, in turn request, integrity data of each of their corresponding dependencies. The submission of downstream requests for integrity data may continue until all applications and/or processes in the dependency tree are covered.

Kernel Service

As noted above, an application may transmit an API call to a kernel service to obtain integrity data of the application. The kernel service may furnish, in response to such requests, an integrity report of the caller process (e.g., application). The request from the application to the kernel service can include a nonce and a description of the connection on which the request is received. Similar to the nonce provided by the peer to the application in its request for integrity data of the application, the nonce generated by the application and provided to the kernel service may be used to prevent Man-in-the-Middle (MitM) and replay attacks. In response to the request, the kernel service can evaluate the provided description of the connection to verify that the description of the connection is valid (e.g., the destination IP address belongs to the node, the source IP address is not localhost, etc.) and that the destination metric of the connection is owned by the caller application (e.g., the caller application is listening to the destination port specified).

If the kernel service successfully validates the connection details provided by the application in its request to obtain the integrity data of the application, the kernel service can generate and digitally sign the integrity data that is to be provided to the application. The integrity data can include a measurement of the binary and all the linked libraries of the application, the nonce, and the connection description.

Kernel Metrics Storage Service

The kernel metrics storage service may perform similar functions to those of the kernel service described above. For instance, in response to the API call from the application to obtain the kernel secure boot metrics for the kernel, the kernel metrics storage service may determine whether the provided description of the connection is valid and that the destination metric of the connection is owned by the caller application. Further, the kernel metrics storage service may require that the application provide a nonce in order to prevent MitM and replay attacks. If the kernel metrics storage service successfully validates the connection details provided by the application, the kernel metrics storage service may generate a response comprising the requested kernel secure boot metrics for the kernel, the nonce provided by the application, and the description of the connection validated by the kernel metrics storage service. The kernel metrics storage service may digitally sign this response and transmit the digitally signed response to the application to fulfill the request.

Application Response

In response to obtaining one or more responses from any downstream applications from which the application may depend, the application may verify the nonce and connection description specified in the integrity reports obtained from each of the application dependencies (e.g., downstream applications and the dependencies of these downstream applications). If the application successfully verifies the nonce and connection description specified in each of the obtained integrity reports, the application may provide the integrity reports along with the kernel secure boot report to the peer for verification.

Peer Verification

The peer on receiving the integrity reports can verify the nonce, the kernel digital signature, and the connection description. If the peer is able to successfully verify the nonce, kernel digital signature, and the connection description, the peer may proceed to verify the kernel secure boot metrics and the measurements of the binary and all the linked libraries of the application. These measurements can be compared against KGVs either on the node itself or on an external server. If the application is proved to be authentic, the peer may verify any of the application dependencies from the dependency tree using the integrity reports of these dependencies obtained by the application and provided to the peer along with the integrity report of the application itself. In some instances, the connection details of the dependencies need not be verified as this may be performed by the application that has been confirmed to be genuine. To employ an attestation-based scheme for establishing protocol peering with uncompromised nodes, the approaches herein can enhance the protocols to carry attestation, provide optimization for ease of verifying attestation, use DNS to host KGVs to verify claims, prove resource usage by the application, etc.

Enhancing the Protocols to Carry Attestation

As previously noted, the approaches herein can enhance the protocols to carry attestation. Non-limiting example enhancements can include 1) attestation in Address Resolution Protocol (ARP) with stapling, 2) attestation in Neighbor Discovery Protocol (NDP) with stapling, 3) attestation in DHCPv4/v6, and 4) SSH with attestation.

1. Attestation in ARP Protocol with Stapling

The ARP protocol is an important part of Internet Protocol version 4 (IPv4) network connectivity. Operating below the network layer, ARP binds an Internet Protocol (IP) address to the MAC identifier of a network device. ARP is subject to a variety of attacks including spoofing and cache poisoning. Several tools exist that can be used to easily launch such attacks. An attack on ARP can subsequently enable more sophisticated denial-of-service (DoS) and MitM attacks.

Various ARP security methods can be used to authenticate ARP using TPM hardware. For example, TPM's Attestation Identity Key (AIK) cryptographic key can be used to digitally sign ARP packets. The disclosed technologies provide other mechanisms which can provide enhanced and improved ARP security. In some examples, a secure approach can include authentication of ARP packets (e.g., as described in https://ieeexploreleee.org/document/7904631/?part=1, which is incorporated herein by reference in its entirety) using TPM and having a host prove its trustworthiness by providing additional information, such as a PCR value, about its system integrity. Upon receiving this response, an ARP requestor can verify attestation information and add an entry in the ARP cache.

In some examples, other mechanisms can be implemented to achieve attestation in ARP. For example, in some cases, an ARP responder can build an ARP response with attestation information (e.g., PCR value) and send it to the ARP requestor. The ARP requestor can verify the attestation information using verifier-server OR. In another example, an ARP responder can build an ARP response with attestation information (e.g., PCR value) and have it stapled with the verifier-server. The ARP responder can then send the stapled response to the ARP requestor and the ARP requestor can verify the stapled response locally. In some cases, the first example approach may need an additional request from the ARP requestor to the verifier service, which can make address resolution slower. However, the second example approach can overcome this. The ARP responder can prepare the ARP response on a regular interval so it does not have to build a response entirely when the ARP request is generated or received.

2. Attestation in IPv6 Neighbor Discovery (ND)

ND replaces ARP in Internet Protocol version 6 (IPv6) for neighbor and router discovery, Duplicate Address Detection (DAD) along with Stateless Address Auto-Configuration (SLAAC). This makes protecting ND important as a rogue router or neighbor can lead to denial of network service attacks. A similar method to ARP can be employed in ND message exchanges to verify the neighbor or router before accepting the data received in the message exchange.

3. Attestation in DHCP (Dynamic Host Configuration Protocol)

The DHCP is a network management protocol used on UDP/IP networks whereby a DHCP server dynamically assigns an IP address and other network configuration parameters to each device on a network so they can communicate with other IP networks. Accordingly, when a DHCP client (e.g., a host requesting an IP address) makes a request to a DHCP Server (e.g., a host that manages the pool of IP addresses for that network), before the DHCP server allocates and assigns an IP address to the DHCP client, it first requests the DHCP client to provide attestation information (e.g., PCR value or additional information). Upon verification, the DHCP server can allocate and assign an IP address to the DHCP client. There could be various methods which the DHCP client can use for attestation.

In a first example, the DHCP client can send an attested request to the DHCP server. The DHCP server can ask the verifier-server, which could be a separate or same host, to verify the same. In another example, the DHCP client can use a TPM chip's AIK cryptographic key to digitally sign attested data and get it stapled from the verifier server. It sends this stapled response to the DHCP server which can verify the stapled response locally and eliminate the need for contacting the verifier server. This can bring performance optimization to the DHCP server, which is needed due to its centralized deployment nature.

Attestation in DHCP can provide various benefits. For example, before any node can join the network, it can ensure that the node is not compromised. This can eliminate attacks where the attacker obtains its own node deployed in the network.

4. Attestation in DHCPv6 (Dynamic host configuration protocol for IPv6)

The Dynamic Host Configuration Protocol version 6 (DHCPv6) is a network protocol for configuring IPv6 hosts with IP addresses, IP prefixes and other configuration data required to operate in an IPv6 network.

IPv6 hosts may automatically generate IP addresses internally using stateless address auto-configuration (SLAAC), or they may be assigned configuration data with DHCPv6. If a DHCPv6 client does not use SLAAC, it can use the same method used in DHCPv4, as described herein, to perform the attestation.

5. SSH with Attestation

Where attestation of a peer node/device on a network and proof that the peer node/device is not compromised is important or desired, SSH with attestation can be implemented as follows. Before connecting to a peer node/device, a verification process can be performed to verify that the peer node/device has not been compromised. This can be performed by leveraging SSH for the peer node/device.

In establishing an SSH session, during SSH server authentication, the SSH server can send, in addition to server credentials (e.g., public cryptographic key or digital certificate), the additional information to the SSH client to convey its own node/device integrity related data. Such additional information can include, for example and without limitation, information about secure boot; logs on software changes made on a node/device; software version checksums for various processes; proof that the node/device is known to support trusted storage for any of the information being provided; integrity of hardware components such as CPU, Network Processor Units (NPUs) and other device sensors, etc.

In some cases, the SSH client can review this attestation information and determine whether to continue or reject the SSH session establishment. Moreover, in some cases, some of the above information can be continuously provided by the SSH server while the session is active. The information can be provided periodically, on demand (e.g., the SSH client requests such information again or SSH rekey interval) or in response to a triggering event (e.g., PCR change on SSH server). In some cases, the session may be terminated immediately in response to either the SSH server having failed to provide attestation information or as a result of the attestation information indicating a lack of trustworthiness. Further, the SSH client can alert a central authority or populate untrustworthiness about that SSH server node in the network.

Providing attestation information verification on an SSH session can benefit not only remote logins but also many other applications which use SSH as a transport mechanism. For example, Secure Copy Protocol/Secure File Transfer Protocol (SCP/SFTP) for file transfers, netconf for device configuration, X11 port-forwarding using SSH, etc., can benefit from attestation verification on an SSH session.

Optimization for Ease of Verifying Attestation

In some cases, measurements can be attested by reporting a signed hash extended register (e.g., PCRs) from the onboard TPM. Some schemes can use a single PCR for extending all the runtime measurements. This involves fetching of all IMA logs that include everything loaded in the systems' runtime to verify the runtime integrity. In other cases, the measurements can be grouped by critical infrastructure application and protocols and dedicated PCRs can be used for extending those measurements. This can allow for optimal data exchange during verification. The verifier can validate the system's boot integrity followed by validating only the service/protocol/application that it is interested this. This can allow for various protocols, such as ARP, NDP, DHCP, SSH, etc., to use attestation before a peer to peer service connection is established.

DNS to Host KGVs to Verify Claims

Some implementations for verification can use application device vendors published KGV to verify the measurement hash of the binaries, libraries or test and list the hash of the binaries by the user to verify the system seen/runtime measurements. However, these implementations can make it difficult to automate and programmatically fetch the KGV in a generic way. Accordingly, in other implementations, a new DNS resource record (RR) for KGV can be created and published in the application software vendor's DNS tree and the KGV RR can be made discoverable. When the application software version and make is discovered, such a DNS RR can be discovered, queried, and used as the KGV.

Proof of Resource Usage by the Application

To facilitate optimization of application/protocol based attestation and verification, given the verifier does not check for all the applications running on a system, it is possible for a rogue application to kill a valid application that extended the measurements and pose as the valid application (e.g., a valid uncompromised Border Gateway Protocol (BGP) process running on a system leads to valid measurements). A rogue application can hijack this by replacing it and using the system resources such as the L4 listening port. The system can report the valid application's measurements when peer requests for the same. This can be prevented by critical infrastructure applications running in a protected, trusted operating system environment. In addition, in some cases, the resource usage and application's runtime can be combined in the measurement.

Having provided an introductory description of an attestation-based scheme for validating peering setup for critical infrastructure protocols, the disclosure now turns to FIG. 1.

FIG. 1 shows an illustrative example of a networking environment, in accordance with various implementations. While pertinent features are shown, those of ordinary skill in the art will appreciate from the present disclosure that various other features have not been illustrated for the sake of brevity and so as not to obscure more pertinent aspects of the example implementations disclosed herein. In this example, the networking environment 100 can include a network 114 of interconnected nodes (e.g., 108A-N, 110A-N, and 112A-N). The network 114 can include a private network, such as a local area network (LAN), and/or a public network, such as a cloud network, a core network, and the like. In some implementations, the network 114 can also include one or more sub-networks, such as sub-network 114A. Sub-network 114A can include, for example and without limitation, a LAN, a virtual local area network (VLAN), a datacenter, a cloud network, a wide area network (WAN), etc. In some examples, the sub-network 114A can include a WAN, such as the Internet. In other examples, the sub-network 114A can include a combination of nodes included within a LAN, VLAN, and/or WAN.

The networking environment 100 can include a source node 102. The source node 102 can be a networking device (e.g., switch, router, gateway, endpoint, etc.) associated with a data packet that is destined for a destination node 116. The source node 102 can communicate with candidate next-hop nodes 108A-108N on the network 114. Each of the candidate next-hop nodes 108A-108N can be included within a respective route between the source node 102 and the destination node 116. Moreover, in some cases, each of the candidate next-hop nodes 108A-108N can communicate with candidate second hop nodes 110A-110N in the network 114. Each of the candidate second hop nodes 110A-110N can similarly communicate with candidate N-hop nodes 112A-112N in the network 114.

The networking environment 100 can also include an attestation routing orchestrator 104. The attestation routing orchestrator 104 can communicate with the candidate next-hop nodes 108A-108N. In some implementations, the attestation routing orchestrator 104 can obtain attestation data (e.g., TPM measurement validation tokens, security measures, signatures, and/or metadata) or vectors from the candidate next-hop nodes 108A-108N. In some examples, the attestation routing orchestrator 104 can obtain additional information from candidate second-hop nodes 110A-110N and/or candidate N-hop nodes 112A-112N, and utilize the additional information in selecting a particular candidate next-hop node for a packet. In some implementations, the attestation routing orchestrator 104 can also obtain additional information from nodes that are more than two hops away (e.g., candidate third hop nodes, candidate fourth hop nodes, etc.).

The attestation routing orchestrator 104 can communicate with a verifier system 106. In some implementations, the attestation routing orchestrator 104 can obtain trusted state, such as a trusted image vector, from the verifier system 106. The verifier system 106 can include a verified state repository 106A and one or more servers 106B. In some examples, the verified state in the verified state repository 106A can include one or more verified images, verified security measurements, verified settings, verified node data, and/or any other verified trust or integrity data. In some implementations, the verified state in the verified state repository 106A can include one or more trusted states or image vectors that are known with a degree of confidence to represent uncompromised states or images (e.g., states or images that have not been hacked, attacked, improperly accessed, etc.).

In some cases, the attestation routing orchestrator 104 can select and direct a data packet to a particular candidate next-hop node of the candidate next-hop nodes 108A-108N based on a trusted state or image vector and the attestation states or vectors. Moreover, the attestation routing orchestrator 104 can direct the data packet destined for the destination node 116 to the particular candidate next-hop node. As will be described in greater detail with reference to FIG. 4, the attestation routing orchestrator can determine whether a particular candidate next-hop node of the candidate next hop nodes can be trusted to securely transmit the data packet destined for the destination node to the destination node or any other nodes along a routing path towards the destination node.

Figure 2:
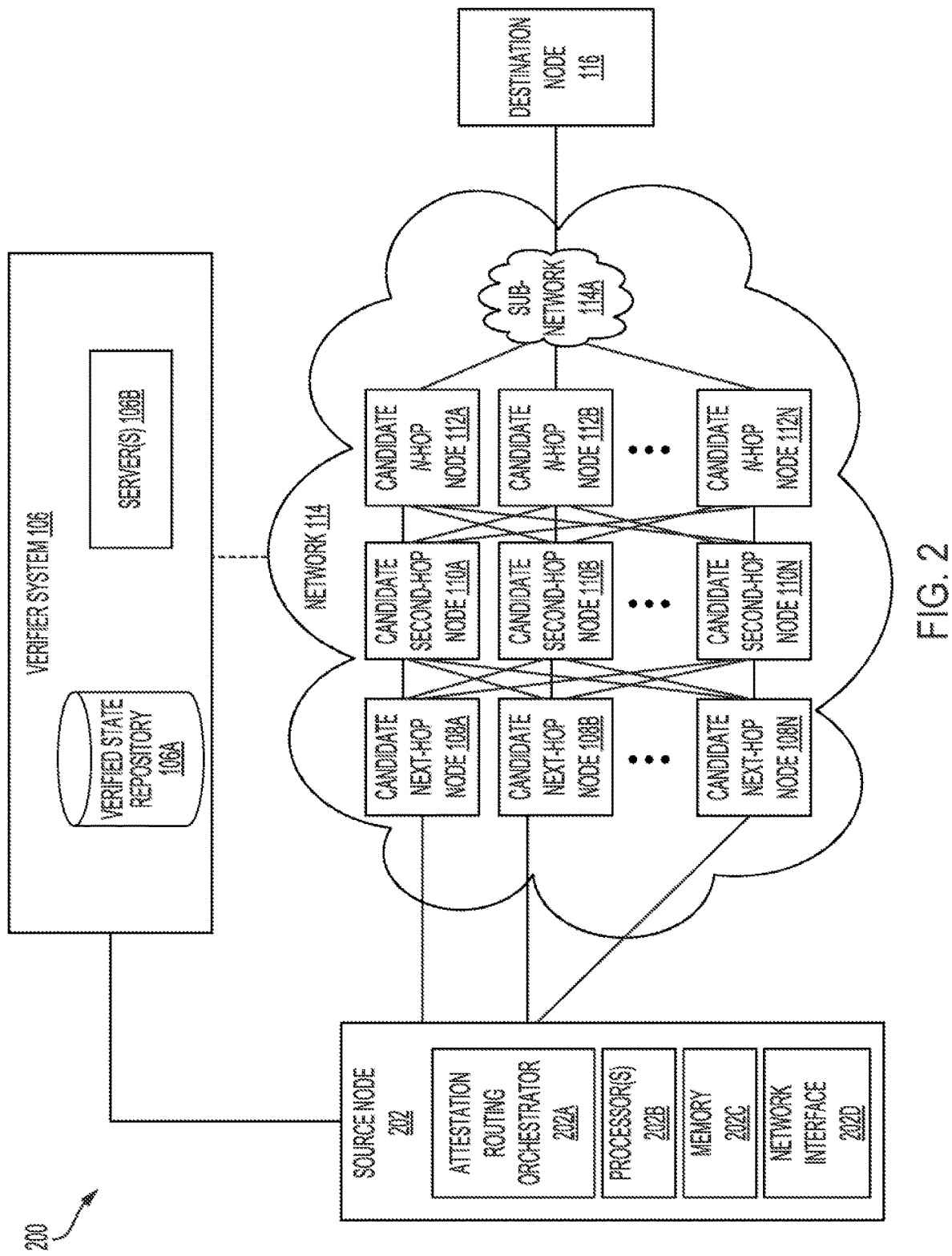
FIG. 2 shows an illustrative example of a networking environment, in accordance with various implementations.

FIG. 2 shows an illustrative example of a networking environment 200, in accordance with various implementations. In this example, the networking environment 200 includes a source node 202 that implements an attestation routing orchestrator 202B. In some implementations, the attestation routing orchestrator 202B can be similar to, or adapted from, the attestation routing orchestrator 104 in FIG. 1.

The source node 202 can include one or more processors 202B. In some implementations, the one or more processors 202B can provide processing resources for generating confidence scores for of the candidate next-hop nodes 108A-108N. In some implementations, the one or more processors 202B can provide processing resources for selecting a particular confidence score, from the confidence scores, that satisfies one or more selection criteria.

In some examples, the source node 202 can include a memory 202C. The memory 202C can be, for example and without limitation, a non-transitory memory, such as RAM (random-access memory), ROM (Read-only memory), etc. The memory 202C can store the data, such as the packet destined for the destination node 116. In some implementations, the memory 202C can store a trusted state or image vector obtained from the verifier system 106. In some implementations, the memory 202C can store attestation states or vectors obtained from the candidate next-hop nodes 108A-108N and optionally attestation states or vectors obtained from the candidate second hop nodes 110A-110N and/or the candidate N-hop nodes 112A-112N. The source node 202 can also include a network interface 202D for obtaining, receiving, and transmitting the data packets and states or vectors. As will be further described with reference to FIG. 4, in various implementations, the source node 202 selects, and directs a data packet to, a particular candidate next-hop node based on the trusted image vector and the first plurality of attestation vectors.

Figure 3:
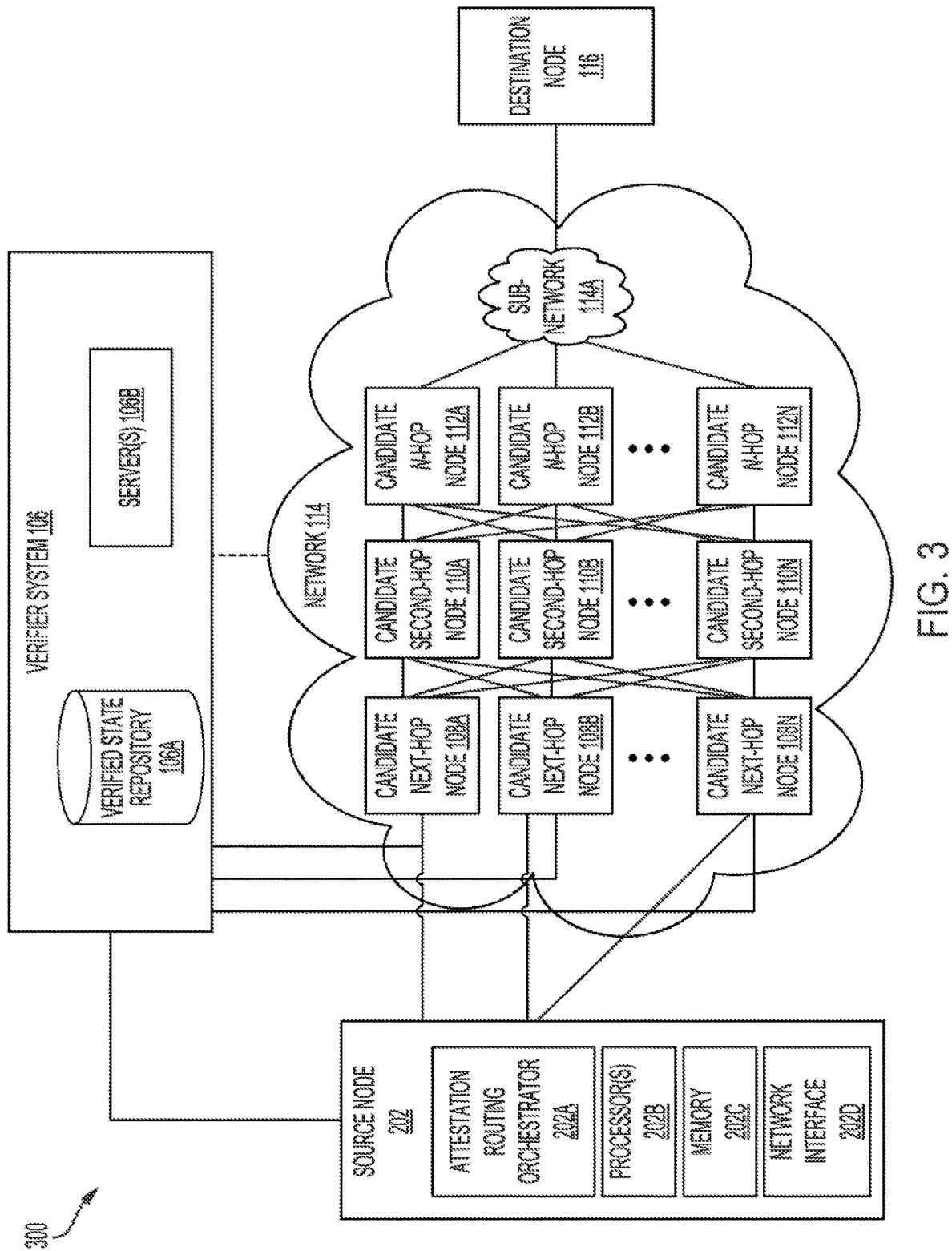
FIG. 3 shows an illustrative example of a networking environment, in accordance with various implementations.

FIG. 3 shows an illustrative example of a networking environment 300, in accordance with various implementations. Notably, in contrast to the networking environment 100 illustrated in FIG. 1 and the networking environment 200 in FIG. 2, in the networking environment 300 one or more of the candidate next-hop nodes 108A-108N can relay a trusted state or image vector from the verifier system 106 to the source node 202. In some implementations, the attestation routing orchestrator 202A can be similar to, or adapted from, the attestation routing orchestrator 104 in FIG. 1 and/or the attestation routing orchestrator 202A in FIG. 2.

In some implementations, the verifier system 106 can sign the trusted state or image vector and provide the signed trusted state or image vector to a particular candidate next hop node, which in turn can provide the signed trusted state or image vector to the source node 202. In some implementations, having the particular candidate next hop node provide the signed trusted state or image vector can reduce attestation time (e.g., the time to determine trustworthiness of the particular candidate next hop node) because the source node 202 may not need to contact a remote node (verifier system 106). In some implementations, attestation time can be further reduced because a single attestation process (e.g., the verifier system 106 signing the trusted state or image vector) facilitates the attesting of multiple source nodes. In other words, trusted states or image vectors may not be generated and evaluated on a per source node basis. Moreover, in implementations in which the source node 202 is not connected to the verifier system 106 (e.g., link down), obtaining the trusted image vector from the particular candidate next hop provides an alternative mechanism for node attestation. In some implementations, the verifier system 106 appends a time-stamped response to the trusted image vector as part of the signing process, sometimes referred to as stapling. Consequently, the source node 202 need not contact the verifier system 106 in order to attest a particular candidate next hop node.

Figure 4:
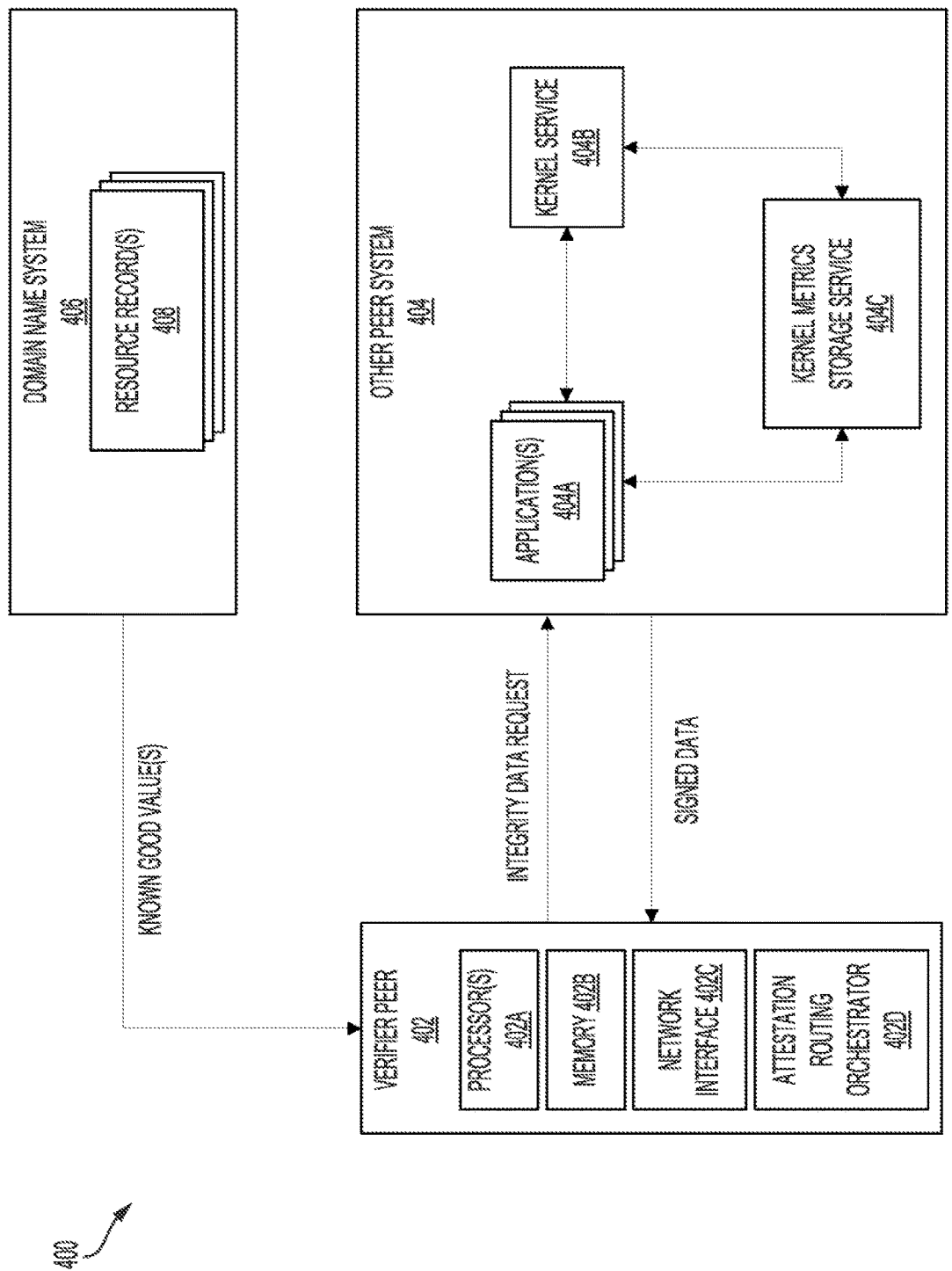
FIG. 4 shows an illustrative example of a networking environment in which a verifier peer system evaluates integrity data from another peer system to determine whether to trust the other peer system in accordance with some implementations.

FIG. 4 shows an illustrative example of a networking environment 400 in which a verifier peer system 402 evaluates integrity data from another peer system 404 to determine whether to trust the other peer system 404 in accordance with some implementations. In various implementations, the verifier peer system 402 is similar to and adapted from the source node 102 illustrated in FIG. 1.

For instance, the verifier peer system 404 may include one or more processors 402A, a memory 404B, a network interface 402C, and an attestation routing orchestrator 402D. In various implementations, the attestation routing orchestrator 402D corresponds to a controller with knowledge of the network that includes the plurality of candidate next-hop nodes and optionally the plurality of candidate second-hop nodes. For example, in some implementations, the attestation routing orchestrator 402D corresponds to a network management system (NMS). As another example, in some implementations, the attestation routing orchestrator 402D corresponds to an intent-based networking system, such as Cisco's digital network architecture (DNA). As yet another example, in some implementations, the attestation routing orchestrator 402D corresponds to a wireless LAN controller (WLC), while the plurality of candidate next-hop nodes and optionally the plurality of candidate second hop nodes correspond to networking devices (e.g., access points, user devices, etc.).

In various implementations, the source node 402 includes one or more processors 402A. In various implementations, the one or more processors 402A provide processing resources for managing attested route information obtained from the attestation routing orchestrator 402D. The source node 402 further includes a memory 402B. In various implementations, the memory 402B corresponds to a non-transitory memory, such as RAM, ROM, etc. In some implementations, the memory 402B stores the obtained attested route information and data packets to be transmitted. The source node 402 further includes a network interface 402C for obtaining the attested route information.

In various implementations, the other peer system 404 is similar to and adapted from any of the candidate next-hop nodes 108A-108N, candidate second next-hop nodes 110A-110N, and candidate N-hop nodes 112A-112N illustrated in FIGS. 1-3. The other peer system 404 may also be a destination node 116 or any other node or computer system that the verifier peer system 402 wishes to verify as being trustworthy for establishing a communications session with the other peer system 404 and for transmission of data packets destined for a destination node.

As illustrated in FIG. 4, the verifier peer system 402 transmits a request to another peer system 404 to obtain integrity data of the other peer system 404 that may be used by the verifier peer system 402 to determine whether the other peer system 404 is trustworthy (e.g., not compromised, has not been hacked, has not been tampered with, etc.). The requested integrity data may include performance or other metrics associated with one or more applications 404A of the other peer system 404, as well as other data related to the applications 404A and other processes executed by the other peer system 404. For instance, the integrity data may include detailed information (e.g., engine information, version information, etc.) about the applications 404A, as well as any metrics or other data associated with the execution of the applications 404A and/or any events impacting performance or functionality of the applications 404A. Additionally, the integrity data of the other peer system 404 may identify a state of, identity of, and/or changes to the other peer system's hardware, firmware, boot loader, kernel, operating system, binaries, files, executables, micro loader, runtime services, and/or other software. The request for the integrity data of the other peer system 404 may be submitted to the other peer system 404 as part of an application layer protocol (e.g., DHCP, SSH, ARP, NDP, etc.) exchange process for establishing trust between the verifier peer system 402 and the other peer system 404. It should be noted that the verifier peer system 402 and the other peer system 404 may each perform similar functions in both verifying the trustworthiness of the other peer systems and furnishing integrity data upon request for the purpose of allowing other peer systems to verify its trustworthiness.

In some implementations, the request from the verifier peer system 402 includes a nonce, which is generated using a random number generator or through any other mechanism that enables selection of a random number or pseudo-random number that is to be utilized once. The nonce may be provided in the request in order to prevent replay attacks and for use as input to one or more cryptographic hash functions, as will be described in greater detail below. The verifier peer system 402 may use its TPM chip's AIK cryptographic key to digitally sign the request. This allows the other peer system 404 to authenticate the request as having been generated by the verifier peer system 402. In some implementations, if the verifier peer system 402 determines that the TPM of the other peer system 404 is trusted (e.g., has been authenticated in response to a previous request including a nonce) or as an alternative to using a nonce altogether, the verifier peer system 402 need not include a nonce in the request. The verifier peer system 402 may instead rely on TPM timing component values (e.g., clock, time) from the TPM of the other peer system 404 to determine whether the integrity data provided by the application 404A is fresh. In some examples, the current time/clock values and/or security measures can be hashed with information within an external TPM. Thus, TPM measurement validation tokens can bind continuously incrementing time/clock values on an attestee with a known external state. Any resetting or restarting of the TPM time/clock values is visible in any subsequent TPM queries, and any restarting of a platform is also exposed in subsequent TPM queries. Within these bounds of reset and restart, the TPM's time ticks counter continuously increments. Therefore, any push of attestee TPM information which includes these time/clock values can be determined to have occurred subsequent to any previously-received measurement. Also, if the reset and restart counters have not changed, the incremental time since any previous measurement can also be known.

The freshness information can allow the verifier peer system 402 to review or verify the integrity data provided with the TPM measurement validation token to determine whether the associated security measurements are sufficiently fresh to be reliable and/or to prevent a malicious actor from simply re-using old data to trick a verifying device. In some cases, the time/clock or counter value can include, for example and without limitation, one or more TPM counter values (e.g., time, clock, reset, restart), a timestamp, or a TUDA time-synchronization token.

In response to receiving the request from the verifier peer system 402, the other peer system 404, via an application 404A, may authenticate the request to ensure that the request originated with the verifier peer system 402 and has not been tampered with. As an example interaction between the verifier peer system 402 and the application 404A of the other peer system 404, the application 404A obtaining the request from the verifier peer system 402 may function as an interface to an HTTP service made available to other peers within a particular network. For instance, the verifier peer system 402 may wish to verify the trustworthiness of the other peer system 404 before accessing a webpage or other content provided by the other peer system 404 via the application 404A. Thus, the verifier peer system 402 may seek to obtain integrity data of the application 404A and of the other peer system 404 itself in order to determine whether the application 404A and the other peer system 404 can be trusted.

If the application 404A determines that the request from the verifier peer system 402 is authentic, the application 404A may transmit an API call to a kernel service 404B of the other peer system 404 to retrieve the integrity data of the application 404A. Further, the application 404A may transmit a second API call to a kernel metrics storage service 404C to obtain the kernel secure boot metrics for the kernel of the other peer system 404. In some implementations, the application 404A identifies any application dependencies (e.g., other applications that the application is dependent on for some functionality, etc.) for which integrity data may be of use in determining the trustworthiness of the application and of the other peer system 404 itself. Based on this identification of application dependencies, the application may transmit additional requests to these application dependencies (e.g., other applications of the other peer system 404) to obtain the integrity data of these downstream applications. Each of these downstream applications, corresponding to the application dependencies, may perform a similar set of operations as those described herein by the initial application processing the request for integrity data from the verifier peer system 402.

In some implementations, the API call to the kernel service 404B and to the kernel metrics storage service 404C may include a nonce and a description of the network connection on which the request is received. The nonce provided by the application 404A may differ from the nonce provided in the request from the verifier peer system 402. For instance, the application 404A may rely on the TPM of the other peer system 404 to generate the nonce for use in an API call to either the kernel service 404B or the kernel metrics storage service 404C. The nonce and description of the network connection may be required in order to prevent MitM attacks or any other nefarious action by other entities.

The kernel service 404B (otherwise referred to as the "kernel," which serves as the core of the other peer system's 404 operating system and enables the applications 404A with access to the various resources of the other peer system 404 to function. Thus, a function of the kernel service 404B may be to maintain the integrity data and other logs associated with each application being executed on the other peer system 404. This integrity data may include detailed information (e.g., engine information, version information, etc.) about the application, as well as any metrics or other data associated with the execution of the application and/or any events impacting performance or functionality of the application.

In some implementations, in response to the request from the application to obtain the integrity data of the application, the kernel service 404B evaluates the provided information about the network connection to determine whether this information is valid. For instance, the kernel service 404B may verify that the destination IP address specified in the provided information belongs to the node. Further, the kernel service 404B may evaluate the provided information to ensure that the source IP address is not specified as being "localhost" or some other invalid value. In some instances, the kernel service 404B may evaluate the provided information to ensure that the destination metric of the connection is owned by the caller application (e.g., the caller application is listening to the destination port specified). If the kernel service 404B is unable to validate the provided information from the application, the kernel service 404B may deny the request to provide the integrity data of the application. Alternatively, the kernel service 404B may include, with the integrity data, information specifying that the application could not be validated.

If the kernel service 404B successfully validates the information provided by the application (e.g., the information about the network connection and the destination metric), the kernel service 404B may generate a response to the request from the application. This response, in some implementations, includes any measurements of the binary and all of the linked libraries of the application (e.g., the integrity data of the application), as well as a nonce that may be used to prevent MitM and replay attacks. Further, the kernel service 404B may combine, in the response, the resource usage and the runtime of the application in the measurement using the kernel service 404B. This may be done in order to prevent a rogue application that hijacks a legitimate application of the other peer system 404 from using the system resources of the other peer system 404 and reporting the legitimate application's measurements.

Additionally, the response generated by the kernel service 404B may include the connection description. The kernel service 404B may digitally sign the response for delivery to the application. In some implementations, the kernel service 404B uses the TPM of the other peer system 404 to digitally sign the response that is to be provided to the application for fulfillment of the application request for its integrity data. The application, in response to obtaining the response from the kernel service 404B may verify the authenticity of the response by evaluating the digital signature, the nonce, and the provided connection description. If the application is unable to verify any of these elements of the response, the application may reject the response or otherwise indicate that an issue affecting the kernel service 404B has been identified.

In some implementations, the kernel service 404B of the other peer system 404 maintains a Bloom filter or other probabilistic data structure to indicate that the kernel service 404B has obtained a set of nonces from various verifier peer systems over a period of time. A probabilistic data structure (e.g., Bloom filter) may be a data structure configured such that, when maintained correctly, a query against the probabilistic data structure (e.g., to determine whether an element is in a set) has a non-zero probability of being incorrect (e.g., due to a hash collision). For instance, in some implementations, a probabilistic data structure is configured such that the probability of a false positive is below a specified threshold to balance the computational efficiency provided by the data structure with the inconvenience caused by reliance on a response from the other peer system 404 as a result of a false positive. Other techniques to mitigate against false positives, such as by reference to a database only when an issue with the other peer system 404, applications 404A of the other peer system 404, and/or the kernel of the other peer system 404 is potentially detected, may be used such that additional computing resources are used to make sure there was an integrity issue only when the potential of an integrity issue having occurred has been detected.

To add a nonce to the Bloom filter, the kernel service 404B may use the nonce to be added as an input to an entry function. The output of this entry function may be hashed and this hash result may be used to set a number of bits within the Bloom filter from zero to one. This serves to indicate that the nonce is now within the Bloom filter. A verifier peer system 402 obtaining this Bloom filter may use the same entry function and hash function(s) used by the kernel service 404B to identify the bits of the Bloom filter that correspond to the nonce it is querying for. If the bits identified by the verifier peer system 402 are each set to one, the verifier peer system 402 may determine, subject to the false positive probability, that the kernel service 404B utilized the nonce to generate the Bloom filter bit array. Alternatively, if any of the bits identified by the verifier peer system 402 are set to zero, then the verifier peer system 402 may determine, definitively, that the nonce it provided to the other peer system 404 was not processed by the kernel service 404B, indicating an issue with the provided integrity data.

In some implementations, to mitigate the risk of false positives, the kernel service 404B identifies a limited number (e.g., batch size) of nonces obtained over a period of time that may be added to the Bloom filter or other probabilistic data. The Bloom filter or other probabilistic data structure generated by the kernel service 404B using the various nonces obtained over a period of time from one or more verifier peer systems may be provided, along with the integrity data for the application 404A, to the TPM of the other peer system 404 to digitally sign the response that is to be provided to the verifier peer system 402. Thus, rather than including the nonce provided by the verifier peer system 402, the digitally signed response to the API call from the verifier peer system 402 may include the Bloom filter and the integrity data obtained by the kernel service 404B.

The verifier peer system 402, in some implementations, can query the Bloom filter or other probabilistic data structure to determine whether the nonce provided to the other peer system 404 was utilized by the kernel service 404B to generate the response. For instance, the verifier peer system 402 may use the nonce as an input to an entry function. The output of this entry function may be hashed and this hash result may be used to identify the corresponding bits within the Bloom filter or other probabilistic data structure. If the verifier peer system 402 determines that any of the identified bits are set to zero within the Bloom filter or other probabilistic data structure, the verifier peer system 402 may determine that the kernel service 404B did not use the provided nonce to generate its response. As noted above, this may cause the verifier peer system 402 to determine that there is an issue with the response provided by the other peer system 404. However, if the bits corresponding to the nonce are each set to one within the Bloom filter or other probabilistic data structure, the verifier peer system 402 may determine that the nonce was used to generate the response. This may cause the verifier peer system 402 to perform additional analyses of the response (e.g., compare to KGVs, etc.) to determine whether the other peer system 404 is trustworthy.

In some implementations, the application also transmits an API call to a kernel metrics storage service 404C to obtain the kernel secure boot metrics for the kernel of the other peer system 404. Similar to the API call to the kernel service 404B, the API call to the kernel metrics storage service 404C may include a nonce that may be used to prevent MitM and replay attacks. Further, the API call may include a description of the connection on which the request is to be received by the kernel metrics storage service 404C. In response to the API call from the application, the kernel metrics storage service 404C may verify that the provided information about the connection is valid and that the destination metric of the connection is owned by the caller application. If the kernel metrics storage service 404C is unable to validate the provided information, the kernel metrics storage service 404C may deny the request and/or transmit a response that indicates an issue with the validity of the application. This response may be provided to the verifier peer system 402 or to another entity that may be perform a security function within the network environment.

If the kernel metrics storage service 404C successfully validates the information provided by the application in its API call, the kernel metrics storage service 404C may generate a response comprising the kernel secure boot metrics for the kernel of the other peer system 404, a nonce to prevent MitM and replay attacks, and a description of the connection. In some implementations, the kernel metrics storage service 404C utilizes the TPM of the other peer system 404 to digitally sign the response for delivery to the application. The kernel metrics storage service 404C may transmit the digitally signed response to the application to fulfill the request from the application to obtain the kernel secure boot metrics.

In response to obtaining the response from the kernel service 404B and from the one or more application dependencies, the application may verify that the integrity data of the application and that of the application dependencies are valid. For instance, the application may verify the digital signature, nonce, and connection description provided in each of the responses provided by the application dependencies to determine whether these are valid. If any of the digital signature, nonce, or connection description are invalid, the application may determine that the corresponding application dependency cannot be deemed trustworthy. The application may generate a response to indicate that the application dependency could not be deemed trustworthy by the application and transmit this response to the verifier peer system 402.

The application may transmit, to the verifier peer system 402, a digitally signed response that includes the integrity data of the application provided by the kernel service 404B. Further, the application may transmit the digitally signed integrity data for each of the application dependencies, as well as the kernel secure boot metrics provided by the kernel metrics storage service 404C in its digitally signed response to the application. The verifier peer system 402 may evaluate the digital signature of the kernel service 404B, the nonce, and the connection description to determine whether these are valid. If any of the digital signature, nonce, or the connection description are invalid, the verifier peer system 402 may determine that the application cannot be trusted (e.g., has been compromised through tampering, hacking, etc.).

If the verifier peer system 402 determines that the digital signature of the kernel service 404B, the nonce, and the connection description provided in the response from the application are valid, the verifier peer system 402 may evaluate the kernel secure boot metrics and the measurements of the binary of the application. In some implementations, the verifier peer system 402 obtains, from a domain name system 406, the KGVs for the kernel secure boot metrics of the other peer system 404 and of the application measurements. For instance, based on the host name of the other peer system 404, the verifier peer system 402 may query the domain name system 406 to identify any resource records 408 associated with the other peer system 404. The resource records 408 may be published in the DNS tree of the various application software vendors and are made discoverable such that, in response to a query from the verifier peer system 402 to obtain the KGVs for an application and kernel of the other peer system 404, the domain name system 406 may identify the associated resource record 408 and provide, from the resource record 408, the KGVs. It should be noted that while DNS and associated resource records are used extensively throughout the present disclosure for the purpose of illustration, other external servers or the verifier peer system 402 itself may maintain the KGVs for the various applications and for the kernel of the other peer system 404.

In some implementations, based on the evaluation of the measurements of the application and of the kernel secure boot metrics, if the verifier peer system 402 determines that these measurements and the kernel secure boot metrics are valid, the verifier peer system 402 evaluates the measurements of the application dependencies to determine whether these are valid. The verifier peer system 402 may determine to evaluate all application dependencies or a limited subset of these application dependencies based on its preferred evaluation process. Thus, the verifier peer system 402 may forego evaluating some of the provided integrity data for the various application dependencies. The verifier peer system 402 may again query the domain name system 406 to obtain, from resource records 408 associated with one or more of these application dependencies, the KGVs for the measurements of these one or more application dependencies for evaluation of the measurements of the application dependencies. The verifier peer system 402 need not evaluate the connection description of the application dependencies as this is accomplished through evaluation of the connection description provided by the original application from which the verifier peer system 402 obtain the response to its request.

The verification of the integrity data for applications 404A of the other peer system 404 may be part of a process to verify the trustworthiness of a plurality of candidate next-hope nodes within a respective route between the verifier peer system 402 (e.g., source node, etc.) and a destination node. The attestation routing orchestrator 402D of the verifier peer system 402 obtains, according to a predefined protocol, a first plurality of attestation vectors from the plurality of candidate next-hop nodes. Each of the plurality of candidate next-hop nodes is included within a respective route between the verifier peer system 402 and a destination node. In various implementations, the respective routes between the verifier peer system 402 and the destination node through each of the plurality of candidate next-hope nodes are independent of each other.

In some implementations, the attestation routing orchestrator 402D determines a plurality of confidence scores. Each of the plurality of confidence scores is based on a comparison between a corresponding one of the first plurality of attestation vectors and a trusted image vector (e.g., comparison between the integrity data for applications of another peer system and the KGVs for the measurements of these applications). In various implementations, the attestation routing orchestrator 402D obtains the trusted image vector from a trusted system, such as the domain name system 406 described above.

In various implementations, the attestation routing orchestrator 402D obtains, according to the predefined protocol, a second plurality of attestation vectors from a corresponding plurality of candidate second-hop nodes. Each of the plurality of candidate second-hop nodes is included within a respective route between a corresponding one of the plurality of candidate next-hop nodes and the destination node. According to these implementations, each of the plurality of confidence scores is additionally based on a comparison between a corresponding one of the second plurality of attention vectors and the trusted image vector in combination with the comparison between the corresponding one of the first plurality of attestation vectors and the trusted image vector. The attestation routing orchestrator 402D selects, from the plurality of confidence scores, a particular confidence score that satisfies one or more selection criteria. The particular confidence score is associated with a particular candidate next-hop node of the plurality of candidate next-hop nodes.

The attestation routing orchestrator 402D directs, to the particular candidate next-hop node, a data packet destined for the destination node. For example, in various implementations, the attestation routing orchestrator 402D provides attested route information to an attested route manager of the verifier peer system 402 in order to facilitate the verifier peer system 402 sending the data packet to the particular candidate next-hop node. The attested route information is indicative of the trustworthiness of each of the plurality of candidate next-hop nodes. For example, in some implementations, the attested route information includes an identifier (e.g., IP address, MAC address, SSID, etc.) identifying a secure, particular candidate next-hop node of the plurality of candidate next-hop nodes. In this example, the verifier peer system 402 provides the data packet based on the identifier in order to route the data packet to the secure, particular candidate next-hop node.

As another example, in some implementations, the attested route information includes a plurality of confidence scores associated with the plurality of candidate next-hop nodes. The determination of confidence scores will be described in further detail, below. In this example, the attested route manager of the verifier peer system 402 selects a particular candidate score based on one or more selection criteria, which is also described in further detail, below. Moreover, the attested route manger provides the data packet to the particular next-hop node associated with the particular candidate score. In various implementations, the attestation routing orchestrator 402D ceases to direct additional data packets to the particular candidate next-hop node in response to determining that the particular confidence score falls below a confidence threshold.

Determination of whether a network device has been compromised or not is a function of available/visible indicators associated with the network device and time. The visible indicators include, but are not limited to, a set of currently available evidence footprints which indicate a compromise may be in place on a particular remote device. Such indicators can come from multiple sources, including from TPM/Aikido, TPM measurement validation tokens, Syslog, Yet Another Next Generation (YANG) Push, EEM, peer devices, traffic counters, and other sources. Visibility can be a preferred method of identifying a compromise, as it is easier to react to the compromise in a timely manner. These indicators may be referred to as visible indicators.

When there are no visible indicators (i.e., no visible footprints available), the probability of a remote device compromise is a function of the time which has passed since the last validation that the device is in a known good state. Time can be a less preferable method compared to visibility method described above, as there will be a lag before any remediation might be applied. These indicator(s) may be referred to as invisible and/or time indicators.

With the above two categories of visible/invisible indicators, an instantaneous formula can be provided for estimating probability or chance of a compromise on any given device operating within a network.

For visible factors/indicators: Pv1 can be defined as probability for compromise of type 1 when there is a specific set of events/signatures existing which correspond to the compromise. Pv2 can be defined as probability for compromise of type 2 and Pvx can be defined as probability for compromise of type x. Assuming each of these compromises Pv1 . . . Pvx are independent, the following formula gives the probability of visible compromise based on recognized signatures (Pv):

$$Pv=1-((-Pv1)(1-Pv2) \ldots (1-Pvx)) \quad (1).$$

Other type of known or to be developed formulas may be used instead of or in conjunction with formula (1) when there are interdependencies between different types of evaluated compromises (Pv1, Pv2, . . . Pvx).

Furthermore, any given probability (e.g., Pv1 . . . Pvx) may be determined based on evidences of events from that device for which the probability of a compromise is being calculated (e.g., via formula (1)) and/or evidence obtained from one or more devices adjacent to the device for which the probability of a compromise is being calculated (e.g., via formula (1)).

For invisible/time factors/indicators, a probability that an invisible compromise has occurred to a remote device in the deployment environment can be expressed by the formula:

$$Pi=1-((1\text{-chance of invisible compromise in time period } t)^{\text{number of } t \text{ intervals since last verification of a good/uncompromised remote system state}}) \quad (2).$$

Effectively knowing Pi implies that on operator knows the half-life which should be expected before a remote device should be considered compromised independently of any concrete evidence. It should be noted that a probability of an invisible compromise does not have to be static. Real time modification based on current knowledge of viruses/attacks may be allowed With formulates for visible and invisible factors as described above (formula (1) and formula (2)), an overall probability of a compromise for a given device may be given by:

$$Pc=1-((1-Pv)*(1-Pi)) \quad (3).$$

Formula (3) provides an indicator of trustworthiness (safety) of a given device. This metric considers both time based entropy and any available evidence which can be correlated to known compromises.

If Pc can be calculated (or even roughly estimated), various costly functions can be efficiently prioritized. For example, a controller may schedule when to do deeper validation (or perhaps direct refresh) of a remote device. This scheduling could include determining when to perform active checks to validate remote device memory locations (locations perhaps containing executable code which might have been compromised). These can be used to return the system to a known good state (and reset the entropy timer). Local configuration repositories can be refreshed based on evidence of security/trustworthiness issues underway, rather than being based just on time. Beyond the scheduling of system checks, there can be forwarding implications based on the value of Pc. For example, routing/switching behavior might be adjusted/impacted based on the relative trustworthiness of a remote device. Where a higher Pc values exist, sensitive data traffic flows can be routed around that device.

As a further advantage of the present disclosure, it should be noted that encryption alone may be insufficient to protect sensitive flows since there are scenarios where even the fact that a flow is occurring between endpoints might be considered information to be protected (e.g., in a battlefield).

Figure 5:
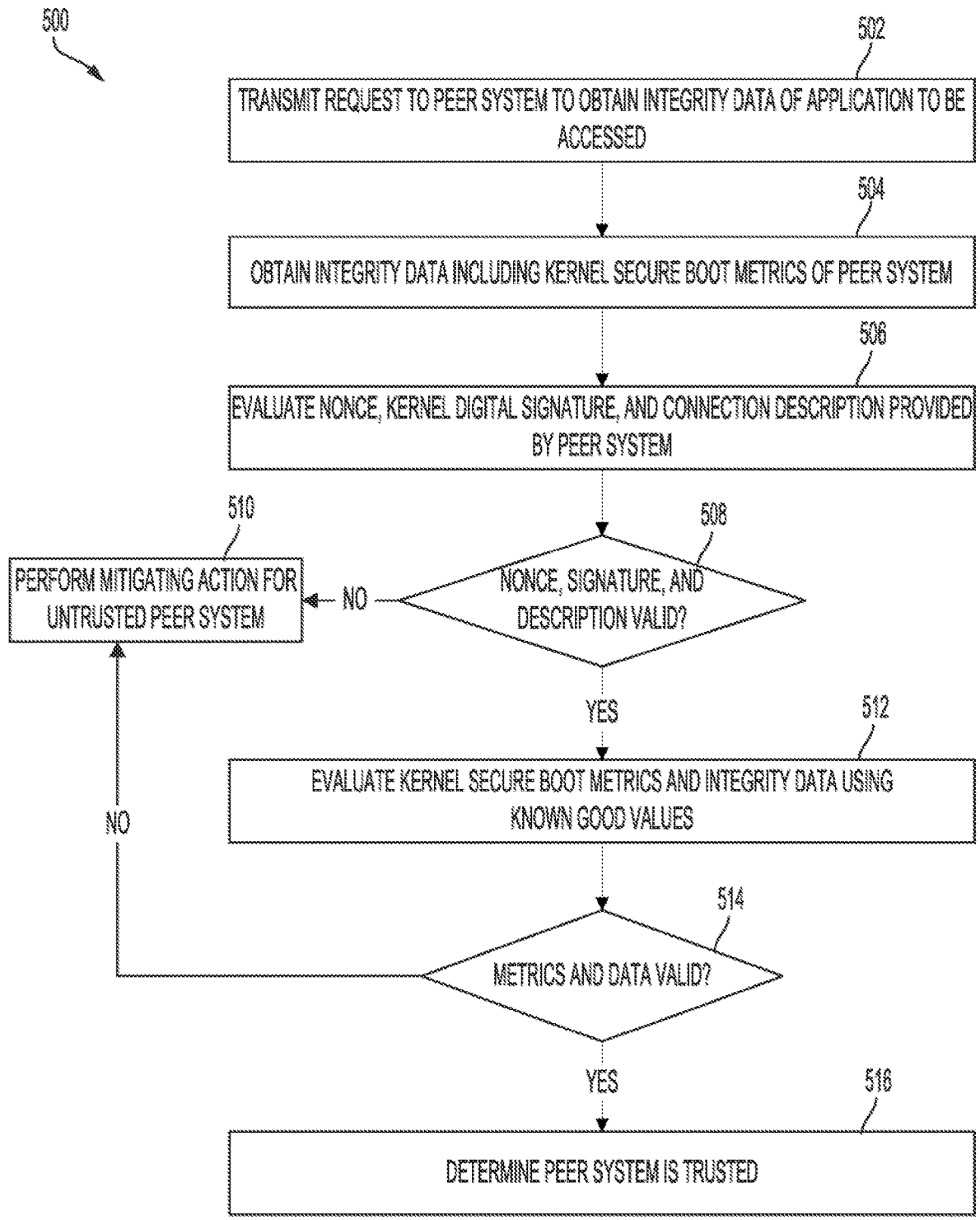
FIG. 5 shows an illustrative example of a process for obtaining and evaluating integrity data and kernel secure boot metrics of another peer system to determine whether to trust the other peer system in accordance with some implementations.

FIG. 5 shows an illustrative example of a process 500 for obtaining and evaluating integrity data and kernel secure boot metrics of another peer system to determine whether to trust the other peer system in accordance with some implementations. The process 500 may be performed by a verifier peer system, which may transmit a request to another peer system to obtain integrity data for one or more applications executed by the other peer system. In some implementations, the verifier peer system transmits 502 a request to another peer system to obtain integrity data of one or more applications that are to be accessed. For example, the verifier peer system may want to determine that an application of the other peer system that is being used to maintain an HTTP service for providing a particular webpage that is to be accessed is trustworthy. Additionally, the verifier peer system may want to ensure that the other peer system itself is trustworthy. The request may include a nonce to prevent any replay attacks.

In response to this request, the verifier peer system obtains 504, from the other peer system, integrity data for the application and of any application dependencies from which the application may depend, as well as the kernel secure boot metrics for the kernel of the other peer system. As noted above, the integrity data and the kernel secure boot metrics may be digitally signed using a TPM of the other peer system and include, at least, a nonce and a connection description. The verifier peer system may evaluate 506 the nonce, kernel digital signature, and the connection description to determine 508 whether these are valid.

If the verifier peer system determines that any of the nonce, kernel digital signature, or the connection description are not valid, the verifier peer system may perform 510 one or more mitigating actions for addressing what is deemed an untrusted peer system. For instance, the verifier peer system may terminate further communications with the other peer system and select another candidate next-hop node for routing to a destination node. Additionally, or alternatively, the verifier peer system may transmit a notification to an administrator of the network to indicate that the other peer system cannot be trusted based on its evaluation of the provided response from the other peer system. This may cause the administrator to identify the source of untrustworthiness and address this issue.

However, if the verifier peer system determines that the nonce, kernel digital signature, and the connection description are valid, the verifier peer system may evaluate 512 the kernel secure boot metrics and the integrity data of the application and of any application dependencies (if any) that the verifier peer system is interested in. In some implementations, the verifier peer system obtains, from a domain name system or any other external system or server that maintains KGVs for various applications and system processes, the KGVs of the application, of any application dependencies that the verifier peer system is interested in, and of the kernel. In some implementations, the KGVs are maintained by the verifier peer system itself.

The verifier peer system may compare the measurements of the application and of any of the application dependencies to the KGVs for the application and of the application dependencies to determine whether these match. Similarly, the verifier peer system may compare the kernel secure boot metrics for the kernel of the other peer system to the KGVs for the kernel to determine whether these match. Through these comparisons, the verifier peer system may determine 512 whether the provided kernel secure boot metrics and measurements (e.g., integrity data) are valid. For instance, if there is a mismatch between the KGVs and the measurements of a particular application, the verifier peer system may determine that this particular application cannot be trusted. This may cause the verifier peer system to perform 510 one or more mitigating actions for addressing an untrusted peer system and/or application. Similarly, if the verifier peer system determines that the provided kernel secure boot metrics for the kernel do not match the KGVs for that kernel, the verifier peer system may determine that the kernel of the other peer system cannot be trusted. In this manner, the verifier peer system may identify any untrusted layers of the other peer system.

If the verifier peer system determines that the kernel secure boot metrics and the measurements for the application and of any application dependencies that the verifier peer system is interested in are valid, the verifier peer system may determine 516 that the other peer system is trustworthy. The verifier peer system may, as a result, establish a secure communications session with the other peer system, transmit data packets to the other peer system for delivery to a destination or to another node for delivery to the destination, and the like.

Figure 6:
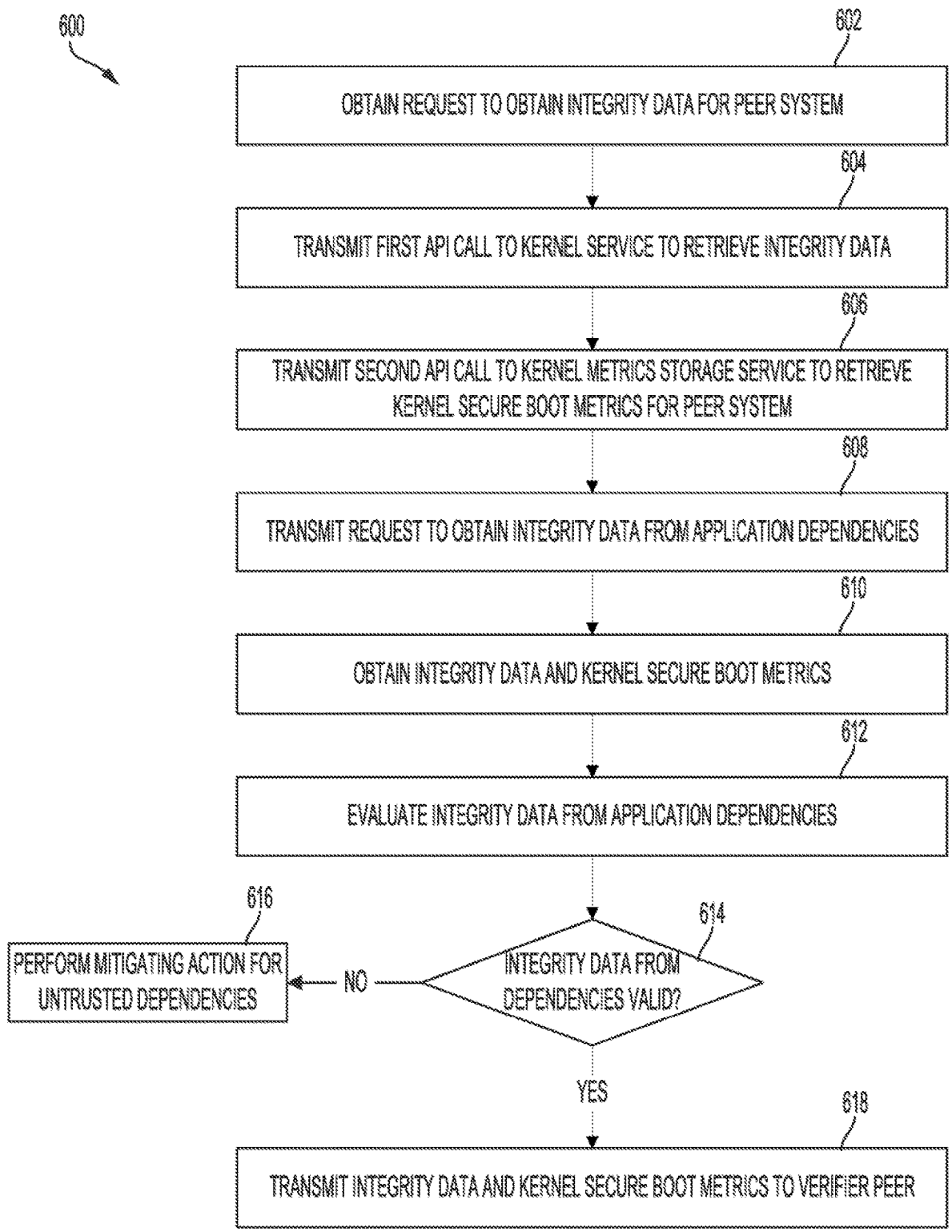
FIG. 6 shows an illustrative example of a process for obtaining integrity data and kernel secure boot metrics of a peer system and evaluating integrity data from a set of application dependencies in accordance with some implementations.

FIG. 6 shows an illustrative example of a process 600 for obtaining integrity data and kernel secure boot metrics of a peer system and evaluating integrity data from a set of application dependencies in accordance with some implementations. The process 600 may be performed by any application of a peer system that obtains a request from a verifier peer system to provide kernel secure boot metrics of the peer system and integrity data of the application and of any application dependencies. In some implementations, the application obtains 602 a request from a verifier peer system to obtain integrity data for the peer system on which the application is being executed. The request from the verifier peer system may include a nonce, which may be used to prevent replay attacks.

In response to the request, the application may transmit 604 a first API call to a kernel service of the peer system to retrieve the integrity data of the application. The first API call may include a nonce and a description on which the request is received. These may be provided in the API call in order to prevent MitM and replay attacks. Additionally, the application may transmit 606 a second API call to a kernel metrics storage service to retrieve the kernel secure boot metrics of the peer system. Similar to the first API call, this second API call may also include a nonce and the description on which the request is received.

In some implementations, the application also transmits 608 one or more requests to obtain the integrity data from a set of application dependencies. For instance, the application may identify its application dependencies, which may include downstream applications or processes that the application may depend on to provide certain functionality via the peer system. The application may transmit a request to each of these identified downstream applications or processes to obtain the integrity data for each of these downstream applications or processes. These downstream applications or processes may, in turn, submit API calls to the kernel service to obtain their integrity data. These API calls may be similar to the first API call described above.

The application may obtain 612 the integrity data of the application from the kernel service, the kernel secure boot metrics from the kernel metrics storage service, and any other integrity data from the downstream applications or processes that the application depends on. In response, the application may evaluate 612 the integrity data from the one or more application dependencies or processes to determine 614 whether this integrity data is valid. For instance, the application may verify that the nonce and the connection description provided with the integrity data from each of the application dependencies or processes is valid. In some implementations, the application can obtain the KGVs for each of these application dependencies or processes and compare these to the measurements provided in their responses to determine whether these match, where a determination of a match may serve to indicate that the integrity data is valid. Alternatively, the application may only verify the nonce and connection description, leaving the evaluation of the integrity data itself to the verifier peer system.

If the application determines that the integrity data from any of the application dependencies or processes is invalid (e.g., the nonce or connection description are invalid and/or if the application evaluates the integrity, the integrity data itself is invalid), the application may perform 616 one or more mitigating actions for these untrusted dependencies. For example, the application may transmit a notification to an administrator of the peer system to indicate that one or more applications or processes executing on the peer system are untrusted. Additionally, or alternatively, the application may indicate, in its response to the verifier peer system, that one or more applications or processes executing on the peer system are untrusted.

If the application determines that the integrity data from the various application dependencies or processes is valid, the application may transmit 618 the integrity data of the application and of its dependencies, as well as the kernel secure boot metrics of the kernel, to the verifier peer system to fulfill the request. This allows the verifier peer system to begin processing the integrity data and the kernel secure boot metrics to determine their validity, as described above in connection with FIG. 5.

Figure 7:
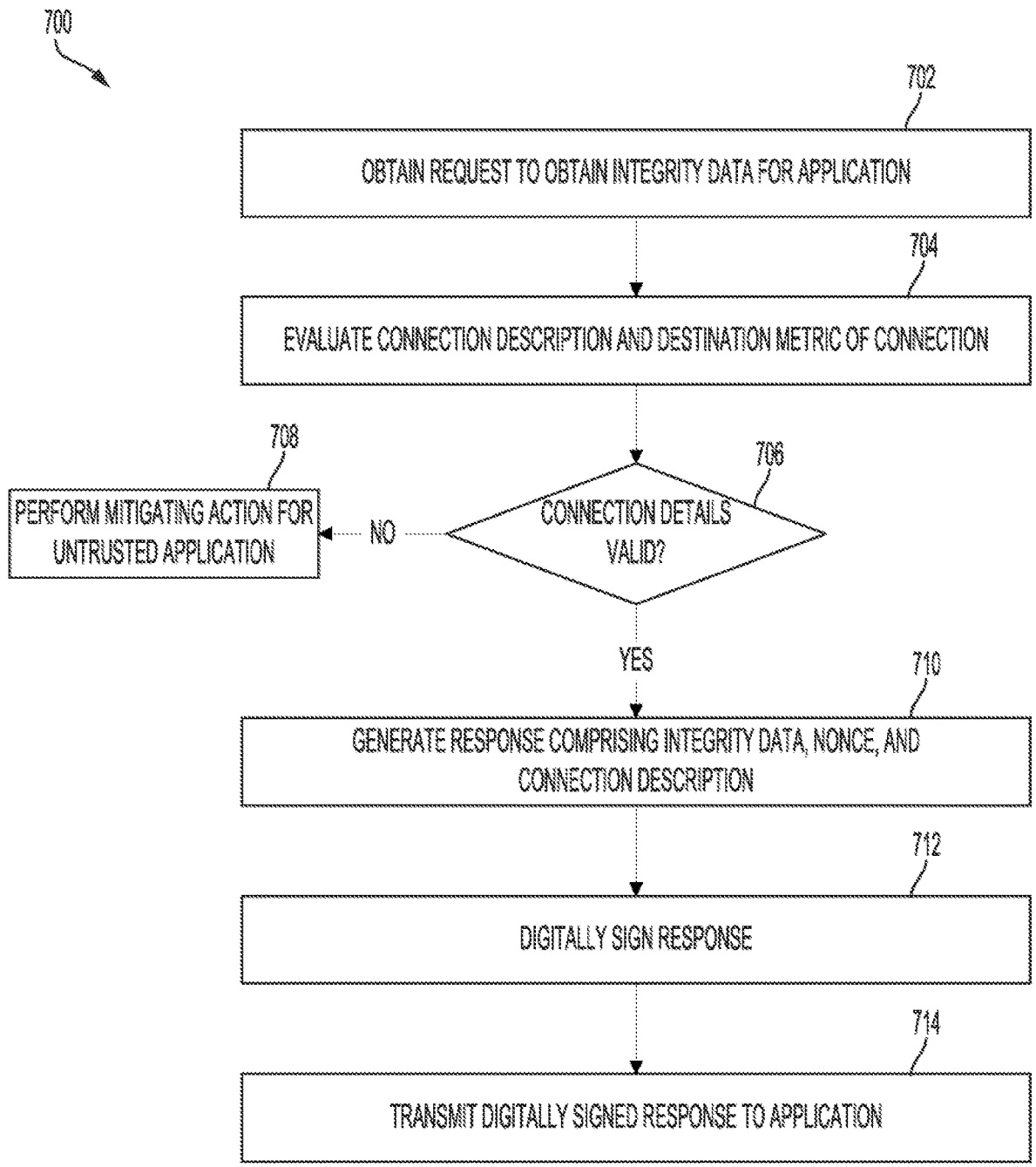
FIG. 7 shows an illustrative example of a process for providing a digitally signed response to an application in response to a request to obtain integrity data of an application in accordance with some implementations.

FIG. 7 shows an illustrative example of a process 700 for providing a digitally signed response to an application in response to a request to obtain integrity data of an application in accordance with some implementations. The process 700 may be performed by a kernel service, which may maintain the integrity data for various applications executing on a peer system. A similar process may be performed by a kernel metrics storage service, which, instead of maintaining integrity data for various applications executing on the peer system, may maintain the kernel secure boot metrics of the kernel.

In some implementations, the kernel service obtains 702 a request from an application of the peer system to obtain integrity data for the application. The request from the application may include a nonce and a description of the connection which the request is received. These elements may be provided to the kernel service in order to prevent MitM and/or replay attacks. In response to the request, the kernel service may evaluate 704 the nonce, the connection description and the destination metric of the connection to determine 706 whether these details are valid. For instance, the kernel service may determine whether the destination IP address specified in the connection description address belongs to the node and that the source IP address is not localhost, etc. Further, the kernel service may verify that the destination metric of the connection is owned by the caller application (e.g., the caller application is listening to the destination port specified).

If the kernel service determines that any of connection details are invalid, the kernel service may perform 708 one or more mitigating actions for an untrusted application. For instance, the kernel service may deny the request from the application to obtain the integrity data of the application. Additionally, or alternatively, the kernel service may transmit a notification to an administrator of the peer system to indicate that an application, having submitted a request to the kernel service to obtain the integrity data of the application, has been deemed to be untrusted by the kernel service. This may cause the administrator to perform its own set of mitigating actions.

If the kernel service determines that the provided connection details are valid, the kernel service may generate 710 a response comprising the requested integrity data, a nonce, and the connection description. Further, the kernel service may digitally sign 712 the response. The kernel service may utilize the TPM of the peer system to generate the digital signature that is to be provided with the response and verifiable by the application upon obtaining this response. Thus, once the response has been digitally signed, the kernel service may transmit 714 this digitally signed response to the application, fulfilling the request from the application.

FIG. 8 illustrates an example network device 800 suitable for performing switching, routing, and other networking operations in accordance with some implementations. Network device 800 includes a CPU 804, interfaces 802, and a connection 810 (e.g., a Peripheral Component Interconnect (PCI) bus). When acting under the control of appropriate software or firmware, the CPU 804 is responsible for executing packet management, error detection, and/or routing functions. The CPU 804 can accomplish these functions under the control of software including an operating system and any appropriate applications software. The CPU 804 may include one or more processors 808, such as a processor from the Intel® X98 family of microprocessors. In some cases, the processor 808 can be specially designed hardware for controlling the operations of network device 800. In some cases, a memory 806 (e.g., non-volatile RAM, ROM, etc.) also forms part of the CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet Over SONET/SDH (POS) interfaces, Fiber Distributed Data Interface (FDDI) interfaces, WiFi interfaces, 3G/4G/5G cellular interfaces, Controller Area Network (CAN) bus, Long Range (LoRa), and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used.

Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC) 812, which can be configured to perform routing and/or switching operations. The ASIC 812 can communicate with other components in the network device 800 via the connection 810, to exchange data and signals and coordinate various types of operations by the network device 800, such as routing, switching, and/or data storage operations, for example.

FIG. 9 illustrates a computing system architecture 900 including various components in electrical communication with each other using a connection 906, such as a bus, in accordance with some implementations. Example system architecture 900 includes a processing unit (CPU or processor) 904 and a system connection 906 that couples various system components including the system memory 920, such as ROM 918 and RAM 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, RAMs 916, ROM 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
obtaining integrity data of an application on a computer system and attesting environment metrics associated with an environment of the computer system;
obtaining reference values corresponding to the integrity data of the application and reference values corresponding to the attesting environment metrics;
determining, based on a first comparison of the integrity data and the reference values corresponding to the integrity data and a second comparison of the attesting environment metrics and the references values corresponding to the attesting environment metrics, that the integrity data and the attesting environment metrics are valid; and
based on the determining that the integrity data and the attesting environment metrics are valid, determining that the computer system is trustworthy.

2. The method of claim 1, wherein the integrity data of the application includes measurements of application dependencies associated with the application, and wherein the method further comprises:
selecting, from the application dependencies, one or more application dependencies;
identifying a subset of the measurements corresponding to the one or more application dependencies; and
determining that the one or more application dependencies are trustworthy based on a result of comparing the subset of the measurements to the reference values corresponding to the integrity data of the application.

3. The method of claim 1, further comprising: transmitting, to a Domain Name System (DNS) server, a request to obtain the reference values corresponding to the integrity data and the reference values corresponding to the attesting environment metrics, the request specifying a host name of the computer system.

4. The method of claim 1, further comprising: sending, to the application, a request for the integrity data of the application, wherein the request for the integrity data of the application includes a nonce and a digital signature, and wherein the nonce and the digital signature are used by the computer system to authenticate the request.

5. The method of claim 1, further comprising:
obtaining a probabilistic data structure, a digital signature of a kernel service operating on the computer system, and a connection description;
determining whether the digital signature of the kernel service and the connection description are valid; and
determining whether a nonce provided with a request to obtain the integrity data of the application is present within the probabilistic data structure.

6. The method of claim 1, further comprising:
establishing a trusted digital certificate chain with the computer system, wherein the trusted digital certificate chain enables authentication of a communication from the application, the communication comprising the integrity data and the attesting environment metrics.

7. The method of claim 1, wherein at least a portion of the attesting environment metrics comprises at least one of kernel secure boot metrics or operating system environment metrics.

8. A system, comprising:
one or more processors; and
memory including instructions that, when executed by the one or more processors, cause the one or more processors to:
obtain integrity data of an application on a computer device and attesting environment metrics associated with an environment of the computer device;
obtain reference values corresponding to the integrity data of the application and reference values corresponding to the attesting environment metrics;
determine, based on a first comparison of the integrity data and the reference values corresponding to the integrity data and a second comparison of the attesting environment metrics and the references values corresponding to the attesting environment metrics, that the integrity data and the attesting environment metrics are valid; and
based on the determining that the integrity data and the attesting environment metrics are valid, determine that the computer device is trustworthy.

9. The system of claim 8, the memory including instructions that, when executed by the one or more processors, cause the one or more processors to:
determine whether to authenticate the application based on an evaluation of the integrity data and the attesting environment metrics using a set of Known Good Values (KGVs); and
determine whether to authenticate the computing device based on an evaluation of at least a subset of second integrity data of one or more application dependencies of the application.

10. The system of claim 9, the memory including instructions that, when executed by the one or more processors, cause the one or more processors to:
transmit, to a DNS server, a request to obtain the set of KGVs from a DNS resource record corresponding to a host name of the computing device; and
receive, from the DNS server, the set of KGVs from the DNS server.

11. The system of claim 8, wherein the system comprises a Trusted Platform Module (TPM), and wherein the memory includes instructions that, when executed by the one or more processors, cause the one or more processors to:
obtain a nonce; and
use an Attestation Identity Key (AIK) of the TPM to digitally sign a request for the integrity data of the application, the request including the nonce.

12. The system of claim 8, the memory including instructions that, when executed by the one or more processors, cause the one or more processors to:
obtain a timer value of a TPM of the computing device, a digital signature of a kernel service of the computing device, and a connection description; and
based on an evaluation of the timer value, the digital signature, and the connection description, determine whether a freshness of the digital signature and the connection description is within an aging threshold.

13. The system of claim 8, the memory including instructions that, when executed by the one or more processors, cause the one or more processors to:

send, to the application, a request for the integrity data of the application, wherein the request for the integrity data of the application includes a nonce and a digital signature, and wherein the nonce and the digital signature are used by the computer system to authenticate the request.

14. The system of claim 8, the memory including instructions that, when executed by the one or more processors, cause the one or more processors to:

obtain a probabilistic data structure, a digital signature of a kernel service operating on the computer device, and a connection description;

determine whether the digital signature of the kernel service and the connection description are valid; and determine whether a nonce provided with a request to obtain the integrity data of the application is present within the probabilistic data structure.

15. The system of claim 8, the memory including instructions that, when executed by the one or more processors, cause the one or more processors to:

establish a trusted digital certificate chain with the computer device, wherein the trusted digital certificate chain enables authentication of a communication from the application, the communication comprising the integrity data and the attesting environment metrics.

16. The system of claim 8, wherein at least a portion of the attesting environment metrics comprises at least one of kernel secure boot metrics or operating system environment metrics.

17. A non-transitory computer-readable medium having stored thereon instructions that, when executed by one or more processors, cause the one or more processors to:

obtain integrity data of an application on a computer device and attesting environment metrics associated with an environment of the computer device;

obtain reference values corresponding to the integrity data of the application and reference values corresponding to the attesting environment metrics;

determine, based on a first comparison of the integrity data and the reference values corresponding to the integrity data and a second comparison of the attesting environment metrics and the references values corresponding to the attesting environment metrics, that the integrity data and the attesting environment metrics are valid; and based on the determining that the integrity data and the attesting environment metrics are valid, determine that the computer device is trustworthy.

18. The non-transitory computer-readable medium of claim 17, wherein the integrity data of the application includes measurements of application dependencies associated with the application, and wherein the instructions, when executed by the one or more processors, cause the one or more processors to:

select, from the application dependencies, one or more application dependencies;

identify a subset of the measurements corresponding to the one or more application dependencies; and determine that the one or more application dependencies are trustworthy based on a result of comparing the subset of the measurements to the reference values corresponding to the integrity data of the application.

19. The non-transitory computer-readable medium of claim 17, including instructions that, when executed by the one or more processors, cause the one or more processors to:

obtain a probabilistic data structure, a digital signature of a kernel service operating on the computer device, and a connection description;

determine whether the digital signature of the kernel service and the connection description are valid; and determine whether a nonce provided with a request to obtain the integrity data of the application is present within the probabilistic data structure.

20. The non-transitory computer-readable medium of claim 17, wherein at least a portion of the attesting environment metrics comprises at least one of kernel secure boot metrics or operating system environment metrics.

* * * * *